(12) United States Patent
Djosic et al.

(10) Patent No.: US 12,058,135 B2
(45) Date of Patent: Aug. 6, 2024

(54) SYSTEM AND METHOD FOR UNAUTHORIZED ACTIVITY DETECTION

(71) Applicant: ROYAL BANK OF CANADA, Toronto (CA)

(72) Inventors: Nebojsa Djosic, Toronto (CA); Bojan Nokovic, Toronto (CA); Salah Sharieh, Toronto (CA); Bingzhou Zheng, Toronto (CA)

(73) Assignee: ROYAL BANK OF CANADA, Toronto (CA)

( * ) Notice: Subject to any disclaimer, the term of this patent is extended or adjusted under 35 U.S.C. 154(b) by 161 days.

(21) Appl. No.: 16/953,783

(22) Filed: Nov. 20, 2020

(65) Prior Publication Data

US 2021/0152555 A1 May 20, 2021

Related U.S. Application Data

(60) Provisional application No. 62/937,923, filed on Nov. 20, 2019.

(51) Int. Cl.
*H04L 9/40* (2022.01)
*G06N 20/00* (2019.01)
(Continued)

(52) U.S. Cl.
CPC .......... *H04L 63/10* (2013.01); *G06N 20/00* (2019.01); *H04L 12/66* (2013.01); *H04L 63/1425* (2013.01); *G06N 5/01* (2023.01)

(58) Field of Classification Search
None
See application file for complete search history.

(56) References Cited

U.S. PATENT DOCUMENTS 6,161,762 A * 12/2000 Bashan ............. G06K 19/0723
235/492
7,355,988 B1 * 4/2008 Denbar ............... H04M 3/5307
370/395.2
(Continued)

FOREIGN PATENT DOCUMENTS

EP          3471007 A1 *  4/2019    ......... G06F 21/552

OTHER PUBLICATIONS

Prisha et al "Identity Risk Analysis in Mobile Commerce: A Novel Approach," 2018, pp. 185-190 (Year: 2018).*
(Continued)

*Primary Examiner* — Luu T Pham
*Assistant Examiner* — James J Wilcox
(74) *Attorney, Agent, or Firm* — Norton Rose Fulbright Canada LLP

(57) ABSTRACT

An authorization access system and method of minimizing unauthorized access to a resource are provided. The authorization access system comprises at least one processor, and a memory storing instructions which when executed by the at least one processor configure the at least one processor to perform the method. The method comprises assigning a first risk score to application programming interface (API) traffic associated with a user device and/or user behaviour pattern observed prior to an API gateway, assigning a second risk score to the API traffic associated with the user device observed at the API gateway, assigning a third risk score to the API traffic associated with the user device and/or back end service responses observed after the API gateway, and performing an authorization action based on any of the first, second or third risk scores.

14 Claims, 10 Drawing Sheets

(51) Int. Cl.
*H04L 12/66* (2006.01)
*G06N 5/01* (2023.01)

(56) References Cited

U.S. PATENT DOCUMENTS

| | | | | |
|---|---|---|---|---|
| 7,543,053 | B2* | 6/2009 | Goodman | H04L 51/212 |
| | | | | 709/224 |
| 7,721,303 | B2* | 5/2010 | Alves de Moura | G06F 8/38 |
| | | | | 709/202 |
| 7,853,533 | B2 | 12/2010 | Eisen | |
| 7,958,147 | B1* | 6/2011 | Turner | G06Q 10/10 |
| | | | | 707/694 |
| 8,589,110 | B2* | 11/2013 | Liu | G01R 31/2834 |
| | | | | 702/121 |
| 8,726,379 | B1* | 5/2014 | Stiansen | H04L 63/1441 |
| | | | | 726/25 |
| 9,100,493 | B1* | 8/2015 | Zhou | G06Q 30/0273 |
| 9,516,053 | B1* | 12/2016 | Muddu | G06F 3/0484 |
| 9,594,904 | B1* | 3/2017 | Jain | G06F 21/563 |
| 9,594,907 | B2* | 3/2017 | Duke | G06F 21/6218 |
| 9,667,501 | B2* | 5/2017 | Dasgupta | H04L 65/40 |
| 9,720,704 | B2* | 8/2017 | Reick | G06F 8/654 |
| 9,729,677 | B2* | 8/2017 | Ge | H04L 67/01 |
| 9,811,818 | B1* | 11/2017 | Xing | G06Q 20/3821 |
| 9,954,879 | B1* | 4/2018 | Sadaghiani | H04L 63/1416 |
| 10,027,711 | B2* | 7/2018 | Gill | H04L 63/1441 |
| 10,037,689 | B2* | 7/2018 | Taylor | G05D 1/0285 |
| 10,084,869 | B2* | 9/2018 | Verkasalo | H04L 41/22 |
| 10,181,032 | B1* | 1/2019 | Sadaghiani | G06N 3/08 |
| 10,320,813 | B1* | 6/2019 | Ahmed | H04L 63/1416 |
| 10,320,841 | B1* | 6/2019 | Allen | G06N 20/00 |
| 10,341,374 | B1* | 7/2019 | Sadaghiani | G06F 18/217 |
| 10,360,304 | B1* | 7/2019 | Alvarez | G05B 15/02 |
| 10,360,403 | B2* | 7/2019 | Burton | H04L 63/102 |
| 10,453,017 | B1* | 10/2019 | Richards | H04L 61/4511 |
| 10,491,617 | B1* | 11/2019 | Sadaghiani | H04L 63/1425 |
| 10,536,475 | B1* | 1/2020 | McCorkle, Jr. | H04L 63/1425 |
| 10,574,683 | B1* | 2/2020 | Ghosh | H04L 63/1425 |
| 10,592,554 | B1* | 3/2020 | Merritt | G06N 5/01 |
| 10,623,423 | B1* | 4/2020 | Sadaghiani | H04L 63/1416 |
| 10,623,435 | B2* | 4/2020 | Jevans | G06F 21/51 |
| 10,630,703 | B1* | 4/2020 | Ghosh | H04L 63/1408 |
| 10,630,704 | B1* | 4/2020 | Ghosh | H04L 63/1416 |
| 10,630,715 | B1* | 4/2020 | Ghosh | H04L 63/1416 |
| 10,630,716 | B1* | 4/2020 | Ghosh | H04L 63/1408 |
| 10,642,995 | B2* | 5/2020 | Shih | H04L 67/141 |
| 10,681,060 | B2* | 6/2020 | Scheidler | G06N 20/00 |
| 10,681,061 | B2* | 6/2020 | Jang | G06N 5/01 |
| 10,699,234 | B1* | 6/2020 | Richards | G06Q 10/0635 |
| 10,740,164 | B1* | 8/2020 | Roy | G06F 9/547 |
| 10,880,322 | B1* | 12/2020 | Jakobsson | H04L 51/08 |
| 10,931,696 | B2* | 2/2021 | Kuppanna | H04L 63/0227 |
| 10,997,318 | B2* | 5/2021 | Barday | G06F 21/622 |
| 11,416,472 | B2* | 8/2022 | Godden | G06F 16/2365 |
| 11,449,063 | B1* | 9/2022 | Ebrahimi Afrouzi | G05D 1/617 |
| 11,477,219 | B2* | 10/2022 | Jenkinson | H04L 63/0209 |
| 11,496,519 | B1* | 11/2022 | Gupta | H04L 9/0872 |
| 11,611,584 | B2* | 3/2023 | Coffing | H04L 63/0281 |
| 11,657,691 | B2* | 5/2023 | Chen | H02J 7/35 |
| | | | | 315/154 |
| 11,757,914 | B1* | 9/2023 | Jakobsson | H04L 51/212 |
| | | | | 726/25 |
| 11,783,341 | B1* | 10/2023 | Gailloux | H04W 12/06 |
| | | | | 455/411 |
| 11,888,883 | B2* | 1/2024 | Givental | G06F 21/552 |
| 2002/0019812 | A1* | 2/2002 | Board | H04L 67/564 |
| | | | | 705/51 |
| 2002/0038282 | A1* | 3/2002 | Montgomery | G06Q 40/04 |
| | | | | 705/37 |
| 2002/0145042 | A1* | 10/2002 | Knowles | G02B 26/10 |
| | | | | 235/462.01 |
| 2002/0150079 | A1* | 10/2002 | Zabawskyj | H04L 12/66 |
| | | | | 370/351 |
| 2003/0019933 | A1* | 1/2003 | Tsikos | G06K 7/10 |
| | | | | 235/454 |
| 2003/0042303 | A1* | 3/2003 | Tsikos | G06K 7/10594 |
| | | | | 235/384 |
| 2003/0093187 | A1* | 5/2003 | Walker | B64D 45/0059 |
| | | | | 701/1 |
| 2005/0097320 | A1* | 5/2005 | Golan | G06Q 20/4014 |
| | | | | 713/166 |
| 2005/0240756 | A1* | 10/2005 | Mayer | G06F 9/4418 |
| | | | | 713/2 |
| 2006/0059107 | A1* | 3/2006 | Elmore | G06Q 30/06 |
| | | | | 705/64 |
| 2007/0128899 | A1* | 6/2007 | Mayer | G06F 9/4406 |
| | | | | 439/152 |
| 2007/0135866 | A1* | 6/2007 | Baker | A61B 5/1113 |
| | | | | 600/407 |
| 2008/0004072 | A1* | 1/2008 | Yu | H04W 12/08 |
| | | | | 455/554.2 |
| 2009/0037514 | A1* | 2/2009 | Lankford | H04L 67/1001 |
| | | | | 709/201 |
| 2010/0070405 | A1* | 3/2010 | Joa | G06Q 20/20 |
| | | | | 705/40 |
| 2011/0167011 | A1* | 7/2011 | Paltenghe | G06Q 10/06 |
| | | | | 705/320 |
| 2011/0247045 | A1* | 10/2011 | Rajagopal | G06F 21/35 |
| | | | | 726/1 |
| 2011/0314145 | A1* | 12/2011 | Raleigh | H04L 12/1496 |
| | | | | 709/224 |
| 2012/0069131 | A1* | 3/2012 | Abelow | G06Q 30/0601 |
| | | | | 345/589 |
| 2012/0095798 | A1* | 4/2012 | Mabari | G06Q 10/0637 |
| | | | | 705/7.17 |
| 2012/0232927 | A1* | 9/2012 | Larruga | G16H 40/67 |
| | | | | 705/3 |
| 2013/0066568 | A1* | 3/2013 | Alonso | G01M 3/243 |
| | | | | 702/51 |
| 2013/0097706 | A1* | 4/2013 | Titonis | G06F 21/566 |
| | | | | 726/22 |
| 2013/0145367 | A1* | 6/2013 | Moss | G06F 9/45558 |
| | | | | 718/1 |
| 2014/0236801 | A1* | 8/2014 | Hansen | G06Q 50/16 |
| | | | | 705/37 |
| 2015/0310188 | A1* | 10/2015 | Ford | H04L 63/101 |
| | | | | 726/28 |
| 2015/0343144 | A1* | 12/2015 | Altschul | A61B 5/4839 |
| | | | | 604/503 |
| 2016/0044054 | A1* | 2/2016 | Stiansen | H04L 63/1416 |
| | | | | 726/24 |
| 2016/0099963 | A1* | 4/2016 | Mahaffey | H04L 63/166 |
| | | | | 726/25 |
| 2016/0205125 | A1* | 7/2016 | Kim | H04L 63/1408 |
| | | | | 726/23 |
| 2016/0283715 | A1* | 9/2016 | Duke | G06N 20/00 |
| 2016/0330219 | A1* | 11/2016 | Hasan | G01C 21/387 |
| 2016/0330235 | A1* | 11/2016 | Thompson | H04L 63/10 |
| 2017/0017760 | A1* | 1/2017 | Freese | G16H 40/63 |
| 2017/0041296 | A1* | 2/2017 | Ford | G06F 21/64 |
| 2017/0103440 | A1* | 4/2017 | Xing | H04W 12/06 |
| 2017/0118239 | A1* | 4/2017 | Most | H04L 63/168 |
| 2017/0128769 | A1* | 5/2017 | Long | H04L 67/10 |
| 2017/0161720 | A1* | 6/2017 | Xing | G06Q 20/3829 |
| 2017/0191847 | A1* | 7/2017 | Chintakindi | G01C 21/3484 |
| 2017/0214701 | A1* | 7/2017 | Hasan | H04L 63/1491 |
| 2017/0221167 | A1* | 8/2017 | Weeks | G06Q 50/265 |
| 2017/0230402 | A1* | 8/2017 | Greenspan | H04W 12/08 |
| 2017/0235848 | A1* | 8/2017 | Van Dusen | G06Q 10/101 |
| | | | | 705/12 |
| 2017/0250997 | A1* | 8/2017 | Rostamabadi | H04L 63/1416 |
| 2017/0251002 | A1* | 8/2017 | Rostamabadi | G06F 21/566 |
| 2017/0251003 | A1* | 8/2017 | Rostami-Hesarsorkh | |
| | | | | G06N 5/01 |
| 2017/0270299 | A1* | 9/2017 | Kim | G06F 21/566 |
| 2017/0293740 | A1* | 10/2017 | Xing | G06Q 10/10 |
| 2017/0344745 | A1* | 11/2017 | Wadley | H04L 63/10 |
| 2017/0364795 | A1* | 12/2017 | Anderson | G06N 20/10 |
| 2018/0027006 | A1* | 1/2018 | Zimmermann | H04L 63/0227 |
| | | | | 726/11 |
| 2018/0041529 | A1* | 2/2018 | Mixer | H04L 63/0245 |
| 2018/0082189 | A1* | 3/2018 | Cormier | G06N 5/022 |

(56) References Cited

U.S. PATENT DOCUMENTS

| | | | |
|---|---|---|---|
| 2018/0082208 A1* | 3/2018 | Cormier | G06N 5/048 |
| 2018/0115578 A1* | 4/2018 | Subbarayan | H04L 63/04 |
| 2018/0124033 A1* | 5/2018 | Greenspan | G06F 21/31 |
| 2018/0137771 A1* | 5/2018 | Wahidy | G06N 5/022 |
| 2018/0152471 A1* | 5/2018 | Jakobsson | G06Q 50/01 |
| 2018/0167402 A1* | 6/2018 | Scheidler | G06N 20/00 |
| 2018/0174133 A1* | 6/2018 | Williams | G06Q 20/409 |
| 2018/0288063 A1* | 10/2018 | Koottayi | G06F 21/50 |
| 2018/0295148 A1* | 10/2018 | Mayorgo | H04L 63/20 |
| 2018/0316712 A1* | 11/2018 | Birch | H04L 63/1483 |
| 2018/0322123 A1* | 11/2018 | Cousins | G06F 16/284 |
| 2018/0357714 A1* | 12/2018 | So | G06N 5/022 |
| 2018/0359277 A1* | 12/2018 | Jevans | G06F 21/56 |
| 2019/0036969 A1* | 1/2019 | Swafford | H04L 67/306 |
| 2019/0036970 A1* | 1/2019 | Shih | H04L 63/1425 |
| 2019/0044978 A1* | 2/2019 | Barday | G06F 21/6245 |
| 2019/0050595 A1* | 2/2019 | Barday | G06Q 10/107 |
| 2019/0050596 A1* | 2/2019 | Barday | H04L 63/1433 |
| 2019/0068627 A1* | 2/2019 | Thampy | H04L 63/1425 |
| 2019/0089725 A1* | 3/2019 | Anachi | G06N 20/00 |
| 2019/0108334 A1* | 4/2019 | Sadaghiani | G06F 21/554 |
| 2019/0114417 A1* | 4/2019 | Subbarayan | G06F 9/54 |
| 2019/0122543 A1* | 4/2019 | Matus | G08G 1/096741 |
| 2019/0156426 A1* | 5/2019 | Drucker | G06Q 40/08 |
| 2019/0158525 A1* | 5/2019 | Rostami-Hesarsorkh | H04L 63/1425 |
| 2019/0173909 A1* | 6/2019 | Mixer | H04L 41/082 |
| 2019/0179799 A1* | 6/2019 | Barday | H04L 67/568 |
| 2019/0180050 A1* | 6/2019 | Barday | H04L 67/1097 |
| 2019/0180052 A1* | 6/2019 | Barday | H04L 67/51 |
| 2019/0199759 A1* | 6/2019 | Anderson | G06Q 50/20 |
| 2019/0222597 A1* | 7/2019 | Crabtree | H04L 63/1425 |
| 2019/0245894 A1* | 8/2019 | Epple | H04L 63/1483 |
| 2019/0260794 A1* | 8/2019 | Woodford | G06F 21/556 |
| 2019/0260795 A1* | 8/2019 | Araiza | H04L 63/1425 |
| 2019/0289021 A1* | 9/2019 | Ford | H04L 9/3239 |
| 2019/0319945 A1* | 10/2019 | Levy | H04L 63/0807 |
| 2019/0319987 A1* | 10/2019 | Levy | H04L 9/50 |
| 2019/0334947 A1* | 10/2019 | Govardhan | G06F 16/951 |
| 2019/0347578 A1* | 11/2019 | Bolding | H04L 63/1433 |
| 2019/0349351 A1* | 11/2019 | Verma | H04L 63/30 |
| 2019/0349391 A1* | 11/2019 | Elsner | H04L 63/1425 |
| 2019/0356679 A1* | 11/2019 | Sites | H04L 63/1416 |
| 2020/0007579 A1* | 1/2020 | Barday | G06F 21/6245 |
| 2020/0021560 A1* | 1/2020 | Hefley | G06F 21/552 |
| 2020/0028862 A1* | 1/2020 | Lin | H04L 63/104 |
| 2020/0053111 A1* | 2/2020 | Jakobsson | H04L 63/1416 |
| 2020/0067861 A1* | 2/2020 | Leddy | G06F 21/6245 |
| 2020/0076813 A1* | 3/2020 | Felice-Steele | H04L 63/0861 |
| 2020/0076814 A1* | 3/2020 | Cohen | H04L 63/0876 |
| 2020/0076835 A1* | 3/2020 | Ladnai | G06F 18/2178 |
| 2020/0076846 A1* | 3/2020 | Pandian | H04L 63/1425 |
| 2020/0076853 A1* | 3/2020 | Pandian | H04L 61/4511 |
| 2020/0099716 A1* | 3/2020 | Sjouwerman | H04L 63/1466 |
| 2020/0106611 A1* | 4/2020 | Bharatam | H04L 9/0844 |
| 2020/0117523 A1* | 4/2020 | Morrison | G06F 9/547 |
| 2020/0120142 A1* | 4/2020 | Maynard | G06Q 10/067 |
| 2020/0145447 A1* | 5/2020 | Coffey | H04L 63/1425 |
| 2020/0175518 A1* | 6/2020 | Chu | G06Q 20/4016 |
| 2020/0274894 A1* | 8/2020 | Argoeti | H04L 63/1433 |
| 2020/0327222 A1* | 10/2020 | Chhabra | H04L 63/0421 |
| 2020/0380522 A1* | 12/2020 | Perkal | H04L 63/1483 |
| 2021/0005086 A1* | 1/2021 | Cohen | G08G 1/166 |
| 2021/0012115 A1* | 1/2021 | Bodbyl | G06V 20/171 |
| 2021/0019752 A1* | 1/2021 | Nair | G06Q 20/4016 |
| 2021/0035116 A1* | 2/2021 | Berrington | G06N 5/04 |
| 2021/0065170 A1* | 3/2021 | Shriver | G06Q 20/02 |
| 2021/0065171 A1* | 3/2021 | Pliasunov | G06Q 20/3829 |
| 2021/0075814 A1* | 3/2021 | Bulut | H04L 63/20 |
| 2021/0097186 A1* | 4/2021 | Mandal | G06F 21/552 |
| 2021/0097541 A1* | 4/2021 | Nanduri | G06Q 20/4016 |
| 2021/0152555 A1* | 5/2021 | Djosic | H04L 63/1425 |
| 2021/0209249 A1* | 7/2021 | Hoffer | G16H 50/20 |
| 2021/0358301 A1* | 11/2021 | Park | H04W 4/44 |
| 2021/0377212 A1* | 12/2021 | Holtmanns | H04L 63/02 |
| 2022/0028563 A1* | 1/2022 | Klasson | G16H 50/20 |
| 2022/0039908 A1* | 2/2022 | Okajima | A61B 46/20 |
| 2022/0207547 A1* | 6/2022 | Baek | G06Q 20/363 |
| 2022/0292543 A1* | 9/2022 | Henderson | G06Q 30/0252 |
| 2022/0319677 A1* | 10/2022 | Johnson | G06F 16/285 |
| 2022/0327629 A1* | 10/2022 | Chan | G07C 5/0808 |
| 2023/0137417 A1* | 5/2023 | Tiwari | H04L 63/168 726/6 |
| 2023/0222314 A1* | 7/2023 | Alford | G06F 16/2219 706/11 |
| 2024/0008458 A1* | 1/2024 | McIntosh | A01M 1/22 |

OTHER PUBLICATIONS

Kataraya et al "Multilayered Risk Analysis of Mobile Systems and Apps," 2018, pp. 64-67 (Year: 2018).*

Tseng "Threat Analysis for Wearable Health Devices and Environment Monitoring Internet of Things Integration System," IEEE Access, vol. 7, 2019; pp. 144983-144994 (Year: 2019).*

Ndibanje et al "Cross-Method-Based Analysis and Classification of Malicious Behavior by API Calls Extraction," Appl. Sci. 2019, 9, 239; doi:10.3390/app9020239, pp. 1-15 (Year: 2019).*

Ki et al "A Novel Approach to Detect Malware Based on API Call Sequence Analysis," Hindawi Publishing Corporation International Journal of Distributed Sensor Networks vol. 2015, Article ID 659101, pp. 1-9, (Year: 2015).*

Torkura et al "CSBAuditor: Proactive Security Risk Analysis for Cloud Storage Broker Systems," IEEE, pp. 1-10 (Year: 2018).*

Jin et al "A Study on the Security Features of the Parlay API based Application Behavior," IEEE, p. 10.*

Zhang et al "Characterizing Mobile Open APIs in Smartphone Apps," IFIP, pp. 1-9 (Year: 2014).*

Akbulut et al "Software Versioning with Microservices through the API Gateway Design Pattern," pp. 289-292 (Year: 2019).*

I. M. Institute, "IAM processes and activities" [online], 2019, <https://www.identitymanagementinstitute.org/ciam/>, retrieved from Internet Archive Wayback Machine <https://web.archive.org/web/20191001225242/https://www.identitymanagementinstitute.org/ciam/> with snapshot date of Oct. 1, 2019.

Neustar, "IP Reputation: Reducing Online Fraud and Risk", Neustar Inc., Tech. Rep., Oct. 2019.

Riti, P., "Pro DevOps with Google cloud platform: with Docker, Jenkins, and Kubernetes" [online], New York, NY: Apress, 2018, retrieved from the Internet: <http://cds.cern.ch/record/2650471>.

Javelin Strategy & Research, "The State of Strong Authentication 2019—Adoption Rises Under Threat of New Risks And Regulations" [online], Jan. 2019, retrieved from the Internet: <https://www.javelinstrategy.com/coverage-area/state-strong-authentication-2019-adoption-rises-under-threat-new-risks-and-regulations>.

Wiefling, S. et al., "Is this really you? an empirical study on risk-based authentication applied in the wild" [online], 2019, retrieved from the Internet: <http://nbn-resolving.de/urn:nbn:de:hbz:832-epub4-13694>.

Milka, G. et al., "Anatomy of account takeover," in Enigma 2018 (Enigma 2018) [online], Santa Clara, CA: USENIX Association, Jan. 2018, retrieved from the Internet: <https://www.usenix.org/node/208154>.

Freeman, D. et al., "Who are you? A statistical approach to measuring user authenticity" [online] in 23rd Annual Network and Distributed System Security Symposium, NDSS 2016, San Diego, California, USA, Feb. 21-24, 2016, retrieved from the Internet: <http://wp.internetsociety.org/ndss/wp-content/uploads/sites/25/2017/09/who-are-you-statistical-approach-measuring-user-authenticity.pdf>.

HashiCorp. (2019) Vault [online], <https://www.vaultproject.io>, retrieved from Internet Archive Wayback Machine <https://web.archive.org/web/20190930112013/https://www.vaultproject.io/> with snapshot date of Sep. 30, 2019.

Dalvi, N. et al., "Adversarial classification" [online] in Proceedings of the Tenth ACM SIGKDD International Conference on Knowledge Discovery and Data Mining, ser. KDD '04. New York, NY, USA: ACM, 2004, pp. 99-108, retrieved from the Internet: <http://doi.acm.org/10.1145/1014052.1014066>.

(56) References Cited

OTHER PUBLICATIONS

Williamson, G. D. et al., "Enhanced authentication in online banking," Journal of Economic Crime Management, vol. 4, Issue 2, 2006.

Chaudhuri, K. et al., "Differentially private empirical risk minimization" [online], J. Mach. Learn. Res., vol. 12, pp. 1069-1109, Jul. 2011, retrieved from the Internet: <http://dl.acm.org/citation.cfm?id=1953048.2021036.

Barreno, M. et al., "Can machine learning be secure?" [online], in Proceedings of the 2006 ACM Symposium on Information, Computer and Communications Security, ser. ASIACCS '06. New York, NY, USA: ACM, 2006, pp. 16-25, retrieved from the Internet: <http://doi.acm.org/10.1145/1128817.1128824>.

Copeland, B. J., (2020) "Artificial intelligence" [online], retrieved from the Internet: <https://www.britannica.com/technology/artificial-intelligence>.

Smith, B. C. et al., "The Promise of Artificial Intelligence: Reckoning and Judgment." The MIT Press, 2019; Book Review by Gill, Karamjit S.

Launchbury, J., "A DARPA perspective on artificial intelligence" [online], 2020, <https://www.darpa.mil/attachments/AIFull.pdf>, retrieved from Internet Archive Wayback Machine <https://web.archive.org/web/20200611071516/https://www.darpa.mil/attachments/AIFull.pdf> with snapshot date of Jun. 11, 2020.

Akinyelu, A. A. et al., "Classification of phishing email using random forest machine learning technique," J. Applied Mathematics, vol. 2014, pp. 425 731:1-425 731:6, 2014.

Frank, E. et al., "Data Mining", Fourth Edition: Practical Machine Learning Tools and Techniques, 4th ed. San Francisco, CA, USA: Morgan Kaufmann Publishers Inc., 2016.

SecurityMagazine, "Average Business User Has 191 Passwords" [online], Nov. 6, 2017, retrieved from the Internet: <https://www.securitymagazine.com/articles/88475-average-business-user-has-191-passwords>.

Experian, "The 2018 Global Fraud and Identity Report" [online], Tech. Rep., 2018, retrieved from the Internet: <https://www.experian.com/assets/decision-analytics/reports/global-fraud-report-2018.pdf>.

Ng, A., "AI Transformation Playbook" [online], 2018, <https://landing.ai/ai-transformation-playbook>, retrieved from Internet Archive Wayback Machine <https://web.archive.org/web/20200926174005/https://landing.ai/wp-content/uploads/2020/05/LandingAI_Transformation_Playbook_11-19.pdf> with snapshot date of Sep. 26, 2020.

Hastie, T. et al., "The Elements of Statistical Learning", ser. Springer Series in Statistics, New York, NY, USA: Springer New York Inc., 2001.

<https://www.pingidentity.com/en/resources/downloads/pingfederate.html> [online], Accessed 2019, retrieved from Internet Archive Wayback Machine <https://web.archive.org/web/20201024100302/https://www.pingidentity.com/en/resources/downloads/pingfederate.html> with snapshot date of Oct. 25, 2020.

Salian, I., "SuperVize Me: What's the Difference Between Supervised, Unsupervised, Semi-Supervised and Reinforcement Learning?" [online], NVIDIA, Aug. 2, 2018, retrieved from the Internet: <https://blogs.nvidia.com/>.

Voskoglou, C., "What is the best program-ming language for Machine Learning" [online], Developer Nation, May 5, 2017, retrieved from the Internet: <https://towardsdatascience.com/>.

The University of Waikato, "Java for Machine Learning—10 Powerful Libraries" [online], 2020, <https://data-flair.training/blogs/java-machine-learning>, retrieved from Internet Archive Wayback Machine <https://web.archive.org/web/20200421160505/https://data-flair.training/blogs/java-machine-learning/> with snapshot date of Apr. 21, 2020.

The University of Waikato, "The workbench for machine learning" [online], 2019, <https://www.cs.waikato.ac.nz/ml/weka/>, retrieved from Internet Archive Wayback Machine <https://web.archive.org/web/20191224195512/https://www.cs.waikato.ac.nz/ml/weka/> with snapshot date of Dec. 24, 2019.

Markov, Z. et al., "An introduction to the weka data mining system," SIGCSE Bull., vol. 38, No. 3, Jun. 2006, retrieved from the Internet: <https://doi.org/10.1145/1140123.1140127>.

IBM, "A Guide to Optimizing Digital Identity Risk and Experience with Adaptive Access", 2020, <https://adaptiveaccessguide.mybluemix.net/>.

Defense Advanced Research Projects Agency, "DOD Standard Internet Protocol" [online], Jan. 1980, retrieved from the Internet: <https://tools.ietf.org/html/rfc760>.

Fielding, R. et al., "Hypertext Transfer Protocol (HTTP/1.1): Semantics and Content" [online], Internet Requests for Comments, RFC Editor, RFC 7231, Jun. 2014, retrieved from the Internet: <https://tools.ietf.org/html/rfc7231>.

Fielding, R. et al., "Hypertext Transfer Protocol—HTTP/1.1," Internet Requests for Comments, RFC Editor, RFC 2616, Jun. 1999.

W3C Working Group, "User Agent Accessibility Guidelines (UAAG) 2.0" [online], Dec. 15, 2015, <https://www.w3.org/TR/UAAG20/>, retrieved from Internet Archive Wayback Machine <https://web.archive.org/web/20191230112840/http://www.w3.org/TR/UAAG20/> with snapshot date of Dec. 30, 2019.

Traore, I. et al., "Combining Mouse and Keystroke Dynamics Biometrics for Risk-Based Authentication in Web Environments," 11 2012, pp. 138-145.

Alaca, F. et al., "Device fingerprinting for augmenting web authentication: Classification and analysis of methods" [online], in Proceedings of the 32Nd Annual Conference on Computer Security Applications, ser. ACSAC '16. New York, NY, USA: ACM, 2016, pp. 289-301, retrieved from the Internet: <http://doi.acm.org/10.1145/2991079.2991091>.

Kohavi, R., "The power of decision tables," in 8th European Conference on Machine Learning, Springer, 1995, pp. 174-189.

<https://risk.lexisnexis.com/products/threatmetrix> [online], Accessed 2019, retrieved from Internet Archive Wayback Machine <https://web.archive.org/web/20200102131216/https://risk.lexisnexis.com/products/threatmetrix> with snapshot date of Jan. 2, 2020.

* cited by examiner

SYSTEM AND METHOD FOR UNAUTHORIZED ACTIVITY DETECTION

CROSS REFERENCE TO RELATED APPLICATIONS

This application is a non-provisional of, and claims all benefit, including priority to US Application No. 62/937,923, dated 20 Nov. 2019, entitled SYSTEM AND METHOD FOR UNAUTHORIZED ACTIVITY DETECTION, incorporated herein in its entirety by reference.

FIELD

The present disclosure generally relates to the field of network security, and in particular to a system and method for unauthorized activity detection.

INTRODUCTION

Many authentication and authorization services today are based on risk assessments. Many Internet applications provide use risk based authentication and authorization with IP address as a high weighted indicator.

SUMMARY

In accordance with an aspect, there is provided an authorization access system. The authorization access system comprises at least one processor, and a memory storing instructions which when executed by the at least one processor configure the at least one processor to assign a first risk score to application programming interface (API) traffic associated with a user device observed prior to an API gateway, assign a second risk score to the API traffic associated with the user device and/or user behaviour pattern observed at the API gateway, assign a third risk score to the API traffic associated with the user device and/or back-end service responses observed after the API gateway, and perform an authorization action based on any of the first, second or third risk scores.

In accordance with another aspect, there is provided a method of minimizing unauthorized access to a resource. The method comprises assigning a first risk score to application programming interface (API) traffic associated with a user device and/or user behaviour pattern observed prior to an API gateway, assigning a second risk score to the API traffic associated with the user device observed at the API gateway, assigning a third risk score to the API traffic associated with the user device and/or back-end service responses observed after the API gateway, and performing an authorization action based on any of the first, second or third risk scores.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

Embodiments will be described, by way of example only, with reference to the attached figures, wherein in the figures.

It is understood that throughout the description and figures, like features are identified by like reference numerals.

DETAILED DESCRIPTION

Figure 1:
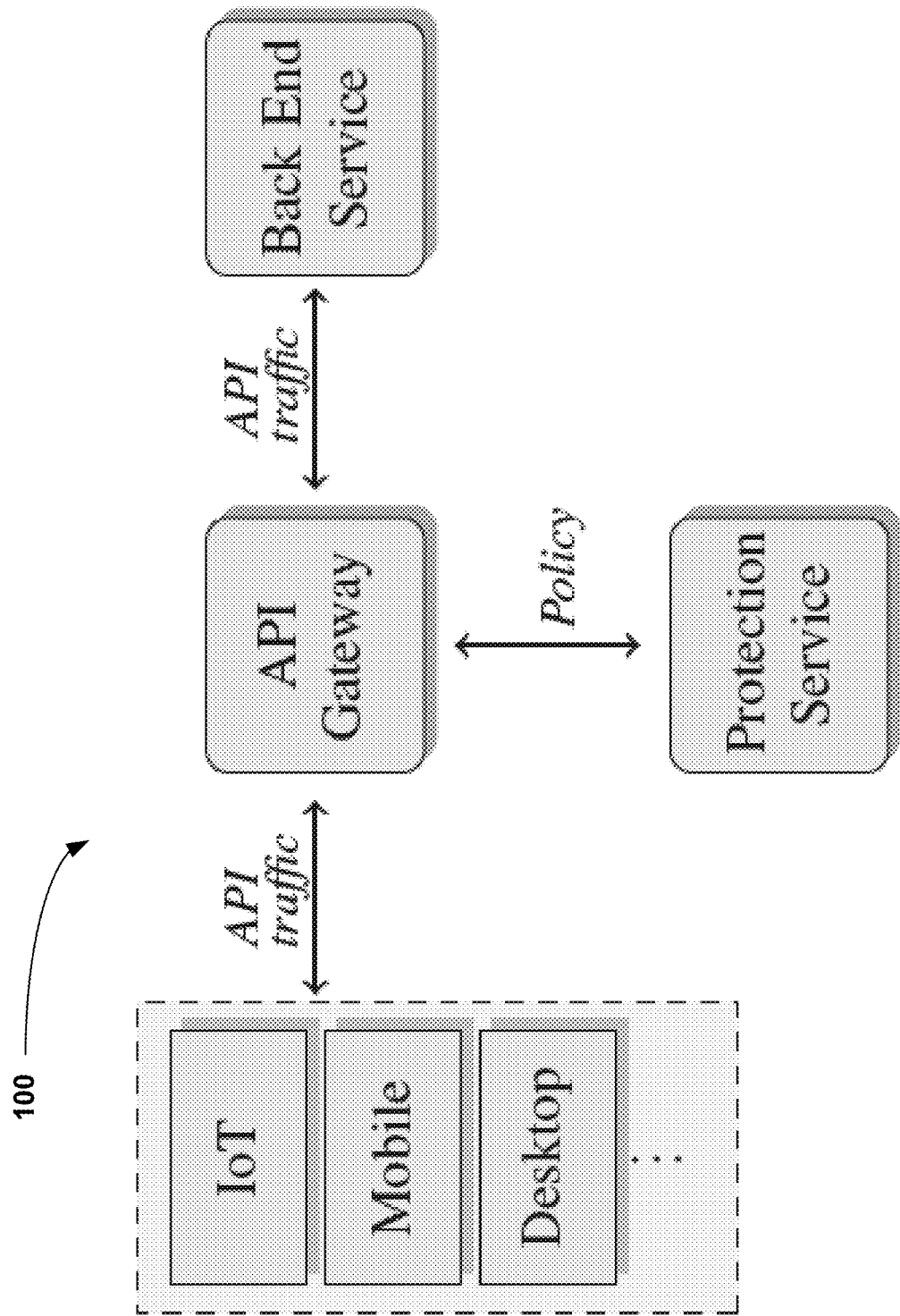
FIG. 1 illustrates an example of an enterprise API protection system model.

Embodiments of methods, systems, and apparatus are described through reference to the drawings. Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

Application Programming Interface (API) is a method of accessing digital information through various channels such as desktop applications, mobile applications, the Internet of Things (IoT), etc. API security is different from web application security and network security from the identity and access management (IAM) point of view. Since an API may give access to valuable data, it should be maximally protected from malicious users and bots. In 2018, organizations which experienced the consequences of API security breaches included some of the largest public and private sector companies.

IAM system is a framework that is used to secure API. IAM normally includes two features: authentication and authorization. Authentication is about identifying user, and authorization is on allowing access to a resource only to that particular user.

The authentication mechanisms deployed by online services today can be divided into three groups: single-factor authorization, traditional multi-factor authentication (MFA), and strong authentication. Single-factor authorization is based on passwords. A known weakness of passwords is related to easily guess passwords that some users have as well as password re-use practice, which can increase the vulnerability to potential phishing attacks. To overcome those weaknesses and increase user's security, MFA is introduced.

MFA uses multiple methods, or factors, to verify the identity. The user should provide at least two evidences either from the group of knowledge (i.e., something you know such as passwords, answers to security questions, etc.), the group of possession (i.e., something you have such as cryptographic key, mobile device, etc.) or from the group of inherence (i.e., something you are such as fingerprint, retina, behaviour, etc.). A strong authentication is the process of protecting customers' data through cryptography-backed multi-factor authentication.

These authentication mechanisms, however, have an impact on user interaction since the user needs to always provide correct knowledge, possession, and inherence factors. Because of this, MFA is not popular. An alternative approach is to increase security with minimum or no impact on user's interaction—the process known as Risk-based Authentication (RBA). It is currently deployed to some extent by most leading internet service providers (ISPs).

After user authentication, an IAM system provides end-users and APIs an authorization mechanism in order to grant applications accesses to APIs.

Three existing solutions to mitigate API risks via IAM include (1) moving access privileges from configuration settings to dedicated services that manage secrets and protect sensitive data, (2) mitigating the risks of identity and session threats by taking into account user's geo-location and device type and (3) monitoring, logging, and analyzing the API traffic.

In some embodiments, a holistic secure procedure tailored for enterprise API application is provided. This secure procedure combines methods 2 and 3 and adds the extra early warning and incremental features for accomplishing high level of protection.

The holistic procedure spans the whole IAM lifecycle. It has the ability to detect some type of malicious attacks before user credentials verification to verify security at multiple levels, before, during, and after API gateway. In addition the system creates user profiles and deploy a decision engine based on supervised learning and can improve the profiles and engine over the time. The goal of the holistic procedure is to significantly reduce false-positive responses—the responses when real user are asked for additional verifications or even prevented from entering the system, and to fully eliminate false-negative identification—the responses when a fake/fraudulent user that knows security credentials is allowed to enter the system. The ultimate goal is to raise and maintain API security to the highest possible level.

Artificial intelligence (AI), is the ability of computer to perform intelligent tasks commonly associated with intelligent beings. There are three waves of AI based on (1) handcrafted knowledge, (2) statistical learning, and (3) contextual adaptation. Machine learning belongs to the second wave or statistical learning. ML systems are typically used for classification, clustering, association, and attribute selection. Many ML classification systems are designed to handle intrusion detection and spam e-mail filtering.

To some extent most AI systems can perceive information, learn within an environment, abstract or create new meanings, and reason or be able to plan and decide. In some embodiments described herein, only reasoning and learning components are employed. However, the system is scalable such that inclusion of other components is straightforward and should not affect the performance.

FIG. 1 illustrates an example of an enterprise API protection system model 100. The API traffic comes to the gateway form different sources, such as mobile applications, desktop applications, Internet of Things (IoT) etc. Along with regular traffic, the attempt to access API service may come from malicious users, hackers, automated robots, and the goal of protection service is to block such traffic.

In some embodiments, the protection service may include an integrated a learning-based authentication features. If the credentials are correct, additional user related information is processed and a confidence score is generated. The score represents the correlation to the normal behavior of the given user, as learned from the training data. Based on the resulting score the system has one of three outputs: access is granted, access is denied, or further information is requested.

While, many existing API cybercheck protection systems deploy the protection service either at the API gateway or at some firewall/Web Application Firewall (WAF), in some embodiments described herein, there is provided a multi-layer approach, where in addition to the protection service at gateway, the protection service is deployed before and after a gateway, providing early warning, continuous and incremental protection services.

In some embodiments, a holistic secure process based on the risk evaluation of the three layers is provided. The user should pass all three layers in order to access APIs and retrieve information from them.

Figure 2:
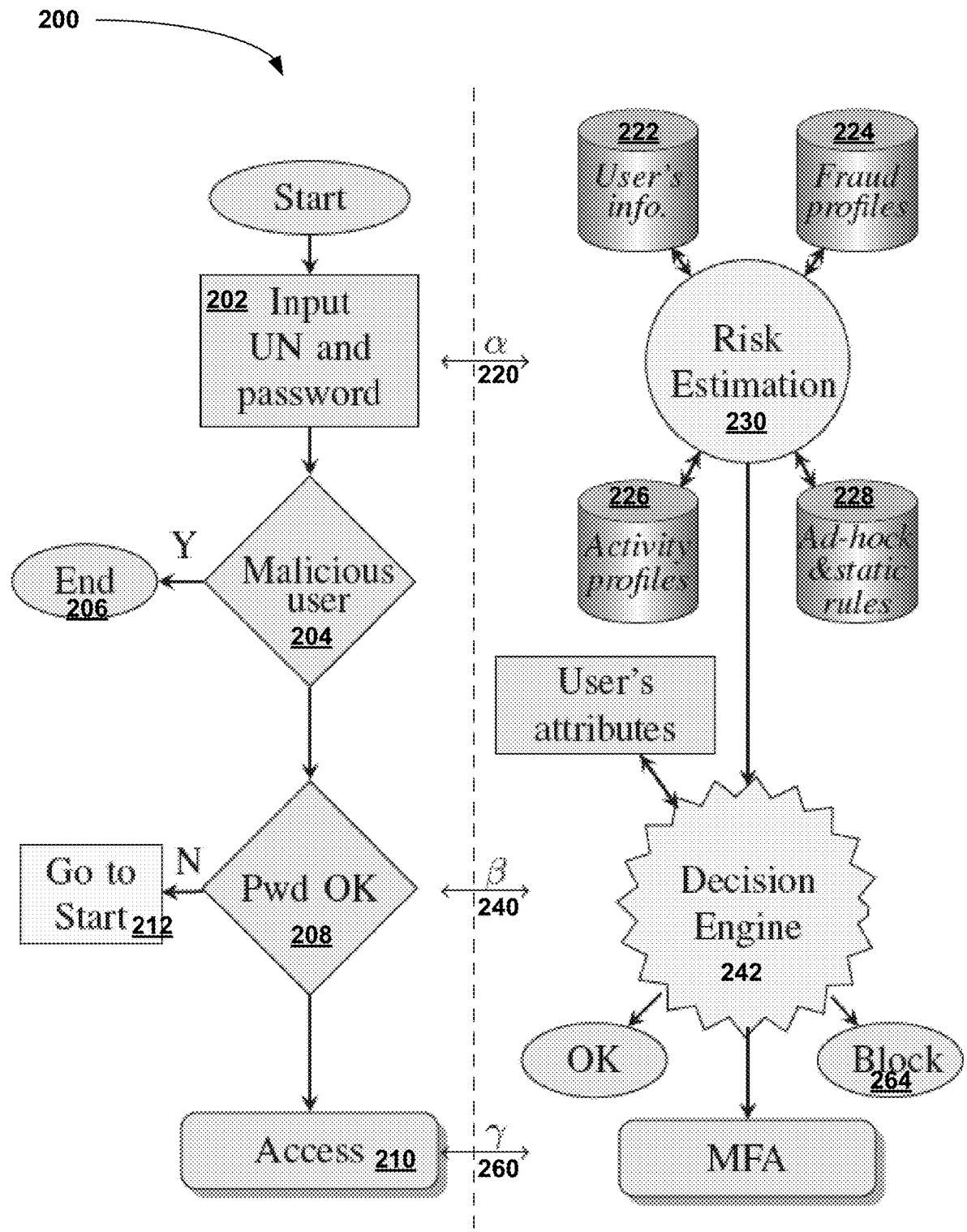
FIG. 2 illustrates an example of a login process and risk evaluation levels timeline, in accordance with some embodiments.

FIG. 2 illustrates an example of a login process and risk evaluation levels timeline 200, in accordance with some embodiments. FIG. 2 show three layers α 210, β 220, and γ 230 associated to the user's activities. A user inputs 202 their user name (UN) and password. If the user is a malicious user 204, then they are not given access 206. Otherwise 204, if the password is authenticated 208, then they are granted access 210. Otherwise 208, they must start over 212.

Layer Alpha 220

The first layer, or alpha 220, calculates risk score 222 by using the user's IP and device information as the identifiers. At this level a user's credentials 202, ID and password, are not known. The system calculates the score at this level mostly based on retrieved information from a user's fraud 224 and activity profile 226. During this process, the system should be capable to recognize some typical boot behaviour or create a default user's profile for a first-time end user based on the aforementioned boot behaviour. This layer may be seen as an early warning system.

Benefits of this approach include fast discovery of potential threats without using computing resources to verify a user's credentials 214. For example, in API enterprise applications, passwords are hashed and kept in a safe places, thus any password verification process requires intensive use of computational power to rehash the input plain text password and compare it with the saved password.

Layer Beta 240

If the user's risk score at level alpha 220 is below the threshold in the decision engine (DE) 242 for this stage, the user is permitted to input their personal information such as ID and password. The system protection service calculates the risk at the level beta in an incremental way, that is, the system utilizes the user's credentials together with the user's behavioural pattern like mouse movements and keyboard stokes 228 if existed and risk information calculated in the alpha stage to calculate risk score. If the score is higher than some threshold, the access is denied, otherwise the access is granted or additional information required, depending on the level of granularity of the risk score threshold.

Layer Gamma 260

Once the user enters the back-end system, their activities related to API usage are continuously monitored. The activities are compared to predicted user behaviour based on the user's profile and real-time continuous credential score calculation. If the user shows an unusual behaviour pattern, the risk score will increase, which may result in blocking 264 access to some or all resources, and/or refusing to return information via APIs response. To access those resources again the user should pass an additional verification.

Risk Evaluation Module

In some embodiments, a risk scoring module calculates the risk of an activity based on various sources of information such as IP address, user agent string, language, display resolution, login time, evercookies, canvas fingerprinting, mouse and keystroke dynamics, field login attempts, WebRTC, counting hosts behind NAT, ad blocker detection, etc.

Figure 3A:
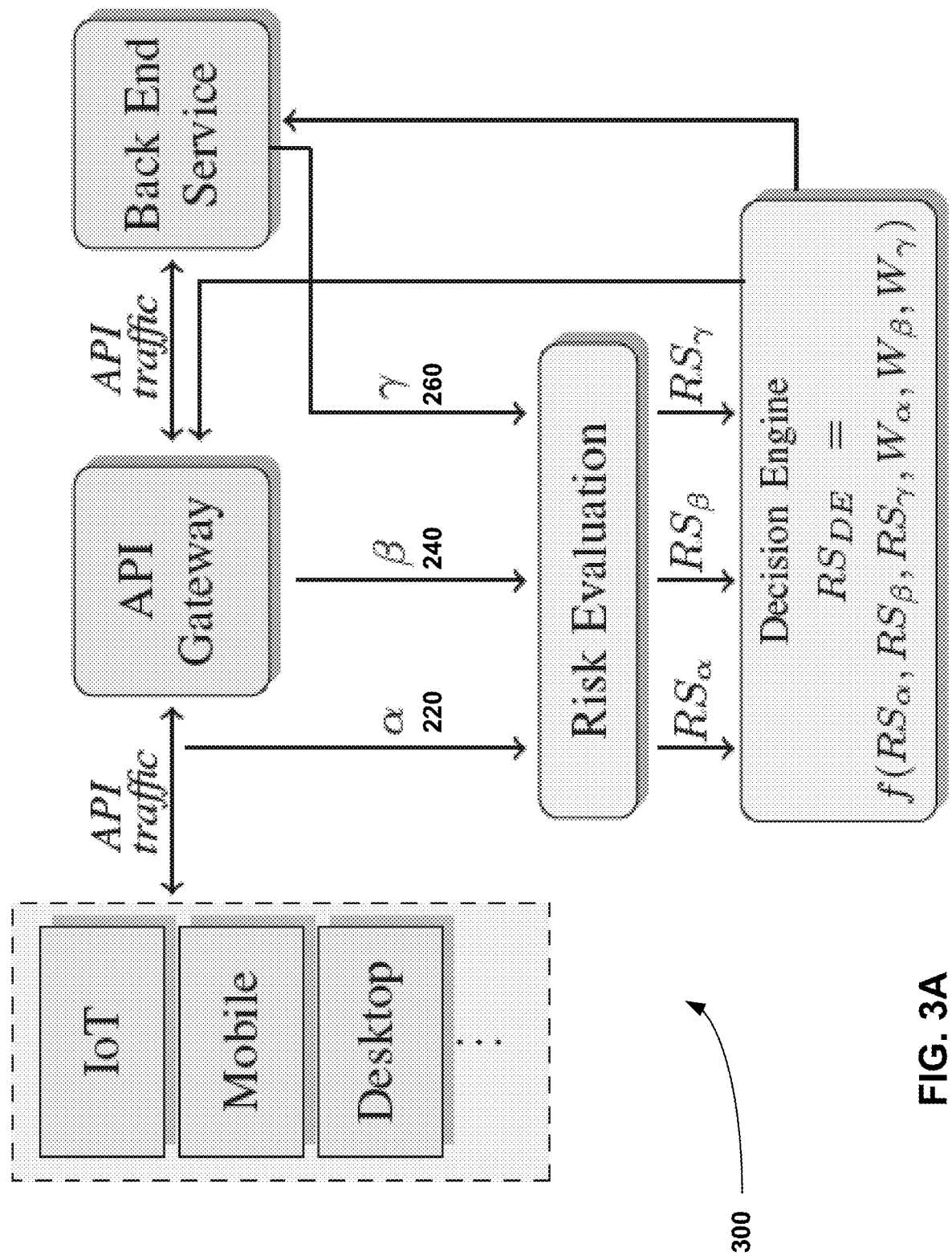
FIG. 3A illustrates an example of multilayer protection, in accordance with some embodiments.

FIG. 3A illustrates an example of multilayer protection 300, in accordance with some embodiments. At the first level 220 (level α) the risk score (RS) is calculated as a function $f_\alpha$ with parameters IP address, Device, and $V_{att}$.

$$RS_\alpha = f_\alpha(IP, Device, V_{att}) \quad (1)$$

where $V_{att}$ is n-dimensional vector of n attributes used in risk score calculation, and Device is device information. The value of $RS_\alpha$ is passed to decision engine (DE) as shown in FIG. 3A.

At the second level 240 (level β) the risk score is calculated as a function $f_\beta$ with three parameters—user's credentials (e.g., user name and password) $U_c$, IP, and $V_{att}$.

$$RS_\beta = f_\beta(U_c, IP, Device, V_{att}) \quad (2)$$

or $$RS_\beta = f_\beta(U_c, RS_\alpha) \quad (3)$$

To estimate risk at next level, the risk estimation at the previous level may be used.

At the third level 260, (level γ) the risk score is calculated as function between $U_c$, IP, Device, attributes $V_{att}$, and user pattern $U_p$ (e.g., mouse and keyboard dynamics)

$$RS_\gamma = f_\gamma(U_c, IP, Device, V_{att}, U_p) \quad (4)$$

or $$RS_\gamma = f_\gamma(RS_\beta, U_p) \quad (5)$$

Risk score cannot be negative, the score on next level is always greater or equal the score on previous level.

$$RS_\alpha \leq RS_\beta \leq RS_\gamma \quad (6)$$

Risk scores at each layer have value between zero (no risk), and one (maximum risk).

$$RS_i \in [0 \ldots 1], i \in \{\alpha, \beta, \gamma\} \quad (7)$$

Risk level at each block is estimated by the supervised machine learning (ML) processes. We create classification algorithms on training data, and we pass real data through the model. The outcome is the risk level i.e., low, medium, high, severe. In this process, data such as fraud profiles, activity profiles, user's info, static rules, are analyzed with real-time user's attributes. The system is supervised machine learning that naturally improves itself over time when more data is added into the training set.

If there is a need to detect a potential hacker that may make use of false credentials, this can be addressed by looking at the patterns of behaviour of former unauthorized users. If a matching pattern is discovered, the risk score will be very high.

Contribution of the attributes to the risk score is not unique, some attributes may have higher impact, some lower impact. To address this, attribute weights are introduced. If multiple attributes are not in the expected range, an additional correction factor that represent common destructive activities is introduced. The weights may be associated with static and ad-hock rules themselves to indicate that some rules are more important than others.

Decision Engine (DE)

A traditional DE receives a risk score, examines which security options are available, and decides what action to take. For example, as shown in FIG. 3A, three risk scores $RS_\alpha$, $RS_\beta$, $RS_\gamma$ are provided to the DE, where $RS_\beta$, $RS_\gamma$ may be optional. The optional value will be set to 0 if it is not passed in. The DE trains a voting system to learn the weights for the three risk scores and calculates the final risk score.

The total risk at all three levels is calculated according to the formula $$RS_{DE} = \frac{W_\alpha RS_\alpha + W_\beta RS_\beta + W_\gamma RS_\gamma}{1 - W_\beta \delta(RS_\beta) - W_\gamma \delta(RS_\gamma)} \quad (8)$$

where $W_\alpha$, $W_\beta$, and $W_\gamma$ are weights associated to each level, $$W_i \in (0 \ldots 1), i \in \{\alpha, \beta, \gamma\}, W_\alpha + W_\beta + W_\gamma = 1 \quad (9)$$

and $\delta(x)$, $x \geq 0$, is delta function defined by the following property $$\delta(x) = \begin{cases} 1 & \text{if } x = 0 \\ 0 & \text{if } x > 0 \end{cases} \quad (10)$$

The threshold controls actions that a DE may take, i.e., making an optional authentication step mandatory or vice versa. At each level, the DE will make the decision based on the risk score for that level. By progressing to the next level, the risk associated to previous level is inherited, so even if the user passes the previous level gate to the next level, the risk from previous level is taken into consideration.

The DE threshold can be set and altered either manually by operators or automatically by the system.

In some embodiments, an intelligent system is provided capable of estimating the level of a user's authentication risk incrementally. The system may be called an application programming interface (API) early warning and incremental system (EWIS).

Figure 3B:
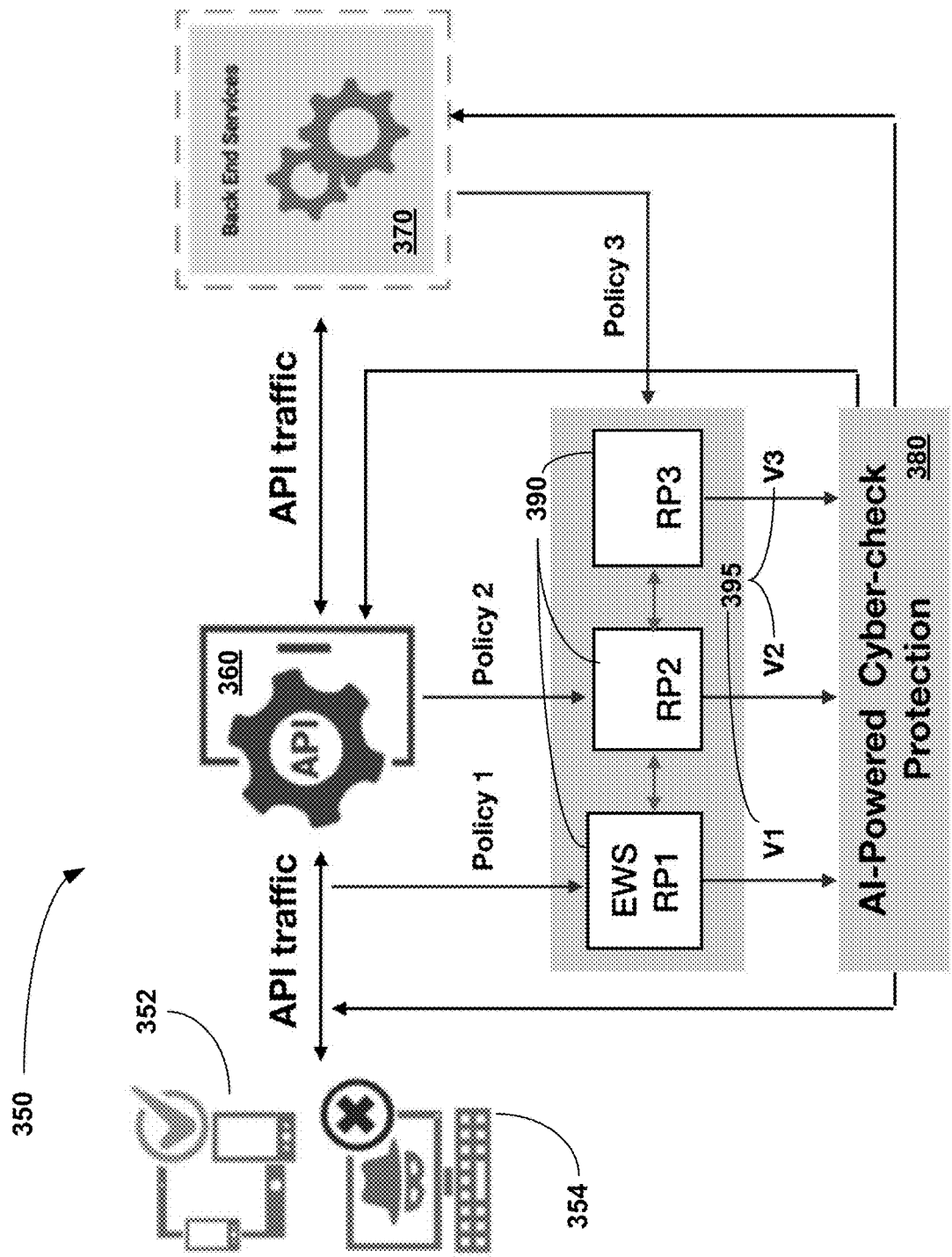
FIG. 3B illustrates, in a component diagram, an example of an API environment, in accordance with some embodiments.

FIG. 3B illustrates, in a component diagram, example of an API environment 350, in accordance with some embodiments. The environment 350 comprises authorized users 352, malicious users 354, an API gateway 360, one or more back end services 370, and an artificial intelligence cybercheck protection system 380. API traffic will pass from users 352, 354 through the API gateway 360 and onto the back end services 370. The system 380 may notify the API gateway 360 when malicious activity on APIs is detected and should be blocked. The observation of API traffic may be integrated over multiple stages. For example, three stages may be used to observe the API traffic: before the API gateway 370, at the API gateway 370, and after the API gateway 370 (e.g., at the back end service 380). Each stage may be associated with a risk detector (RD) 390. For example, three risk detectors (RDs) 390 may be integrated into the system of intelligent cyber-check protection 380. At each stage, the risk level is reported to a decision engine (DE). In some embodiments, the API-EIWS is capable of detecting a hacker's access before the API-gateway 370, and that will save the computing resources.

In some embodiments, attributes related to a user's device information and behavior. The user's device information may pertain to the device internet protocol (IP) address, hardware information (e.g., appVersion, geographic position, hardware configuration), software information (e.g., userAgent, language)). The user behavior may pertain to interface interactive pattern (e.g., mouse movement, keyboard stroke), and the end user access pattern (time pattern, behavior pattern). Based on this information an API-EWIS can signal the warning before a user's authentication about a potential distributed denial of service (DDoS), stacking, malicious bot traffic, and fraudulent accesses. It should be noted that web application firewall (WAF) filter do not have user behavior information.

In some embodiments, each user we have its access record that sets the risk in the user's risk vector. For an unknown user, a default profile may be generated. Using machine learning (ML) access record data analysis may be performed. The result of analysis is a risk score in a scale from 1 to 100. For instance, in the case of DDoS attack, a user's access spike rate will be higher than the value set in access profile, API-EIWS will generate a high-risk score. If some user's behavior is found to resemble a bot, or the user's behavior is different than their normal behavior pattern (fraudulent access), a high-risk score will be generated.

The risk score may be passed to a decision engine (DE) that takes action based on the score. Based on the risk score, the action can be (1) sending a security alert via email, (2) the requirement of an additional simple authentication for the user to access the back end services 370, (3) a requirement of natural language understanding (NLU) and image based authentication, or (4) to block the users' access.

In some embodiments, an iterative approach may be used to allow the integration of risk level at different stages. By this approach sophisticated attackers may be discovered that may not otherwise be discovered by looking at a single stage only.

In some embodiments, risk evaluation is continuous and reported whenever the risk is higher than specified threshold.

In some embodiments, AI algorithms may be used to analyze user behavior.

As shown in FIG. 3B, each risk predictor/detector (RP1, RP2, RP3) 390 has its own policy customized to determine the risk metrics and different stage. The score or risk probability for each stage (v1, v2, v3) 395 is passed to the decision engine that will decide which action to take. Thus, the system 380 will observe the traffic before, at, and after the API Gateway 370, and take action when malicious activity at any stage is detected. This is in contrast to an AI-powered cyberattack detection by identity that interfaces only with the API gateway 370 (i.e., not before or after) to block a hacker's access to the API. This is also in contrast to a security system that provides device, location, behavioral and threat analysis at only one stage by one general policy (that makes attack response time slower). In some embodiments, the multistage implementation will in average decrease user authentication response time which will result in a more granular risk estimating process outcome that will allow for a more tailored response leading to a better user experience.

Figure 4:
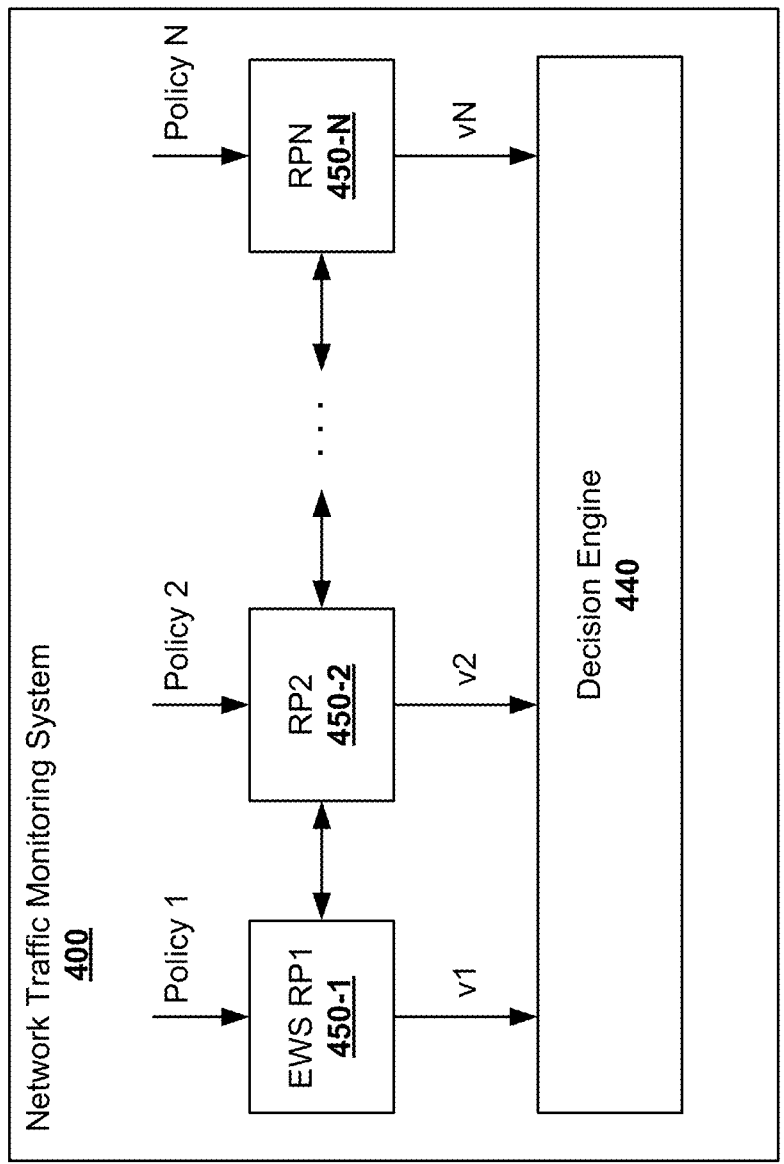
FIG. 4 illustrates, in a component diagram, an example of a network traffic monitoring system, in accordance with some embodiments.

FIG. 4 illustrates, in a component diagram, an example of a network traffic monitoring system 400, in accordance with some embodiments. The system 400 comprises two or more early warning system (EWS) risk predictors/detectors (RP) 450-1, 450-2, 450-N, and a decision engine 440. In some embodiments, there is at least one EWS RP 450 for each of network or API traffic prior to a gateway, at a gateway, and after a gateway. Each EWS RP 450 may have its own policy to determine risk metrics at the stage (prior, at or post gateway) it is monitoring traffic. Each EWS RP 350 may include a unit for monitoring user behavior, including input unit stroke patterns and API action patterns. The cyber protection unit 440 may comprise an AI-powered cyber-check protection unit or any cyber protection unit.

Figure 5:
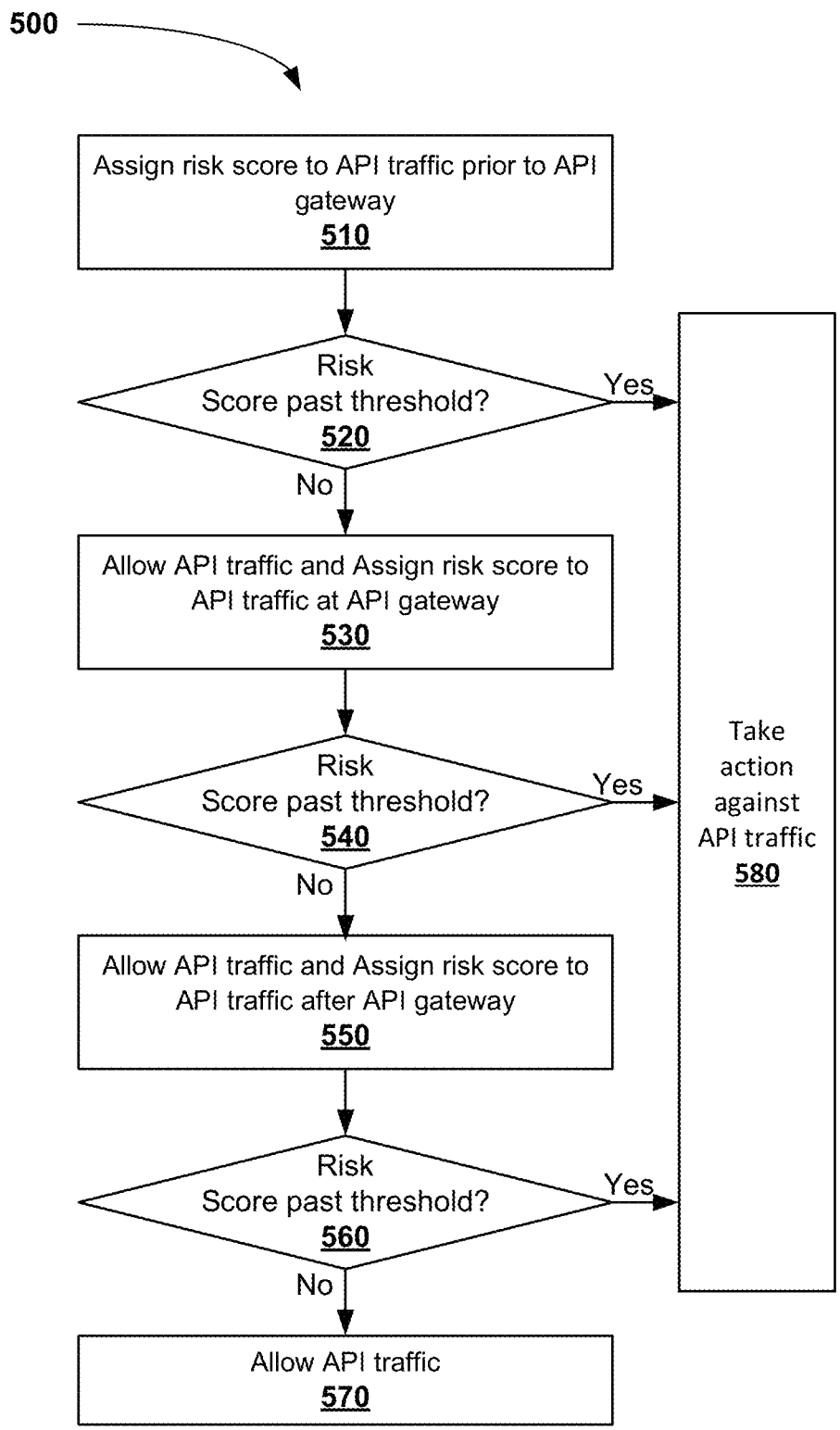
FIG. 5 illustrates, in a flowchart, an example of a method of preventing a malicious or unauthorized access to a back end service, in accordance with some embodiments.

FIG. 5 illustrates, in a flowchart, an example of a method of minimizing malicious or unauthorized access to a back end service 500, in accordance with some embodiments. The method 400 includes assigning a first risk score to API traffic associated with a user device and/or user pattern observed prior to the traffic reaching an API gateway 510. This may include monitoring API traffic by a first EWS RP prior to the traffic reaching the API gateway (for example, in a network reverse proxy). The first risk score may be reported to a decision engine. If the first risk score is past an acceptable threshold 520, then an action is taken 580 with respect to the API traffic prior to the traffic reaching the API gateway. Examples of actions include preventing/blocking the traffic from reaching the API gateway, sending a security alert, noting the IP address associated with the API traffic as being suspicious to the API gateway, and requiring a more comprehensive authentication for a device associated with that IP address.

If the API traffic prior to the gateway is assigned an acceptable first risk score 520, then the API traffic at the API gateway may be monitored and assigned 530 a second risk score. If the second risk score is past an acceptable threshold 540, then an action is taken 580 with respect to the API traffic. In some embodiments, the second risk score may be an independent risk score from the first risk score. In other embodiments, the second risk score may be a cumulative risk score (taking the first risk score into account).

If the API traffic at the gateway is assigned an acceptable second risk score 540, then the API traffic after the API gateway may be monitored and assigned 550 a third risk score. For example, the API traffic may be monitored at a back end service 370 (for example, by observing back end service responses). If the third risk score is past an acceptable threshold 560, then an action is taken 580 with respect to the API traffic. In some embodiments, the third risk score may be an independent risk score from the first or second risk scores. In other embodiments, the third risk score may be a cumulative risk score (taking the first and/or second risk scores into account).

If the API traffic after the gateway is assigned an acceptable third risk score 560, then the API traffic is permitted. Other steps may be added to the method 500, including continuing to monitor subsequent API traffic from the same IP address (before, at, and after the API gateway) and updating risk scores assigned to the subsequent API traffic.

In some embodiments, AI may be used to model user behavior and catch unusual behavior. By monitoring API traffic prior to it reaching the API gateway, an early indication/warning of potential malicious activity may be received. By monitoring API traffic at various locations (pre-gateway, at-gateway, post-gateway), the warning system may be adapted to be incremental which may catch unusual behavior that may only be noticed incrementally.

In some embodiments, user or user device profiles may be generated, stored and updated by the system to maintain a baseline behavior pattern for the user or user device. The API traffic may be monitored and compared to the usual behavior pattern for that user or user device.

In some embodiments, user device identification information may be obtained and matched with the API traffic being monitored. The user device identification information may include an IP address from which the API traffic originates, and hardware or software details about the user device associated with the API traffic.

In some embodiments, the threshold for a risk assessment decision may be a range where authorization actions may be taken for risk values that are below the range, within the range or above the range. Below the range, API traffic may be considered to be normal or safe. Above the range, API traffic may be considered to be malicious and/or unauthorized. Within the range, API traffic may be considered to be questionable. In such circumstances, the API traffic (or user or user device associate with the API traffic) may be flagged to be further monitored. Alternatively, API traffic with a risk value within the range may be subject to additional user authentication credential requests (e.g., passwords, further information to prove identity, etc.).

RIAM

Re-usable identity and access management (RIAM) aims to provide an enterprise wide identity and access management (IAM) solution across an enterprise (e.g., a financial institution such as a bank), as well as external third party applications, including registration, and authentication solution, by following an industry standard OpenID Connect (OIDC) authorization framework. A target consumer may include both internal and external service providers of an enterprise. RIAM is to have an enterprise's IAM solution always follow industry standard new technology with less-to-no changing effort required to each individual enterprise service provider application. In some embodiments, the EWIS may be implemented as part of the RIAM.

In some embodiments, RIAM may help solve an enterprise network system access challenge with respect to scenarios involving one customer vs. multiple applications vs. multiple devices vs. different access control and FinTech growing rapidly, leading to one or more of: an inconsistent user experience, a lack of universal access and account aggregation, too much unnecessary cost on distributed IAM, customers having no single point of enterprise authentication and 360° view on his/her information, a lack of data privacy protection, much duplication of user information data, a bigger challenge on data synchronization, limited room for deep learning without customer data centralization, hard to catch up marketing demand on open banking to FinTech solution, no re-usable data governance solution, and less intelligent fraud detection. The global, re-usable but brand-able IDP may provide login logic and workflow, prospects registration logic and workflow, customer profile setup logic and workflow, customer relationship, setup logic and workflow, and reCAPTCHA implementation. The secured credential management may provide credential, proof-of-credential (password), and credential relationship (child user management). The identity management may provide customer identity, employee identity, proof-of-identity management, identity relationship management, and user lifecycle management. The IDP session management my provided customer authentication behavior collection, IDP activity tracking, and IDP state machine. The security decision engine may provide real-time security analysis, real-time fraud detection, unusual activity detection (such as unusual transaction/trading), and fraud reporting. The data governance and privacy may provide GDPR, and user consent management. The multi-factor authentication may provide (including but not limiting to) legacy authentication (credential and password), OTP-Email and OTP-SMS, PVQ, and biometrics recognition (e.g., fingerprint recognition, retina recognition, facial recognition, voice recognition, and any future new technology). The authentication gateway may provide client application authentication policy management, and making use of OIDC. The access control may provide identity-entitlement management.

In some embodiments, RIAM can be applied to target consumer applications including internal customer-facing applications, internal employee-facing applications, and external third party applications. Internal customer-facing applications may include online banking (non-business), online banking (business), and other online financial institution programs. Internal employee facing applications may include financial planner tools, and employee tools.

Figure 6:
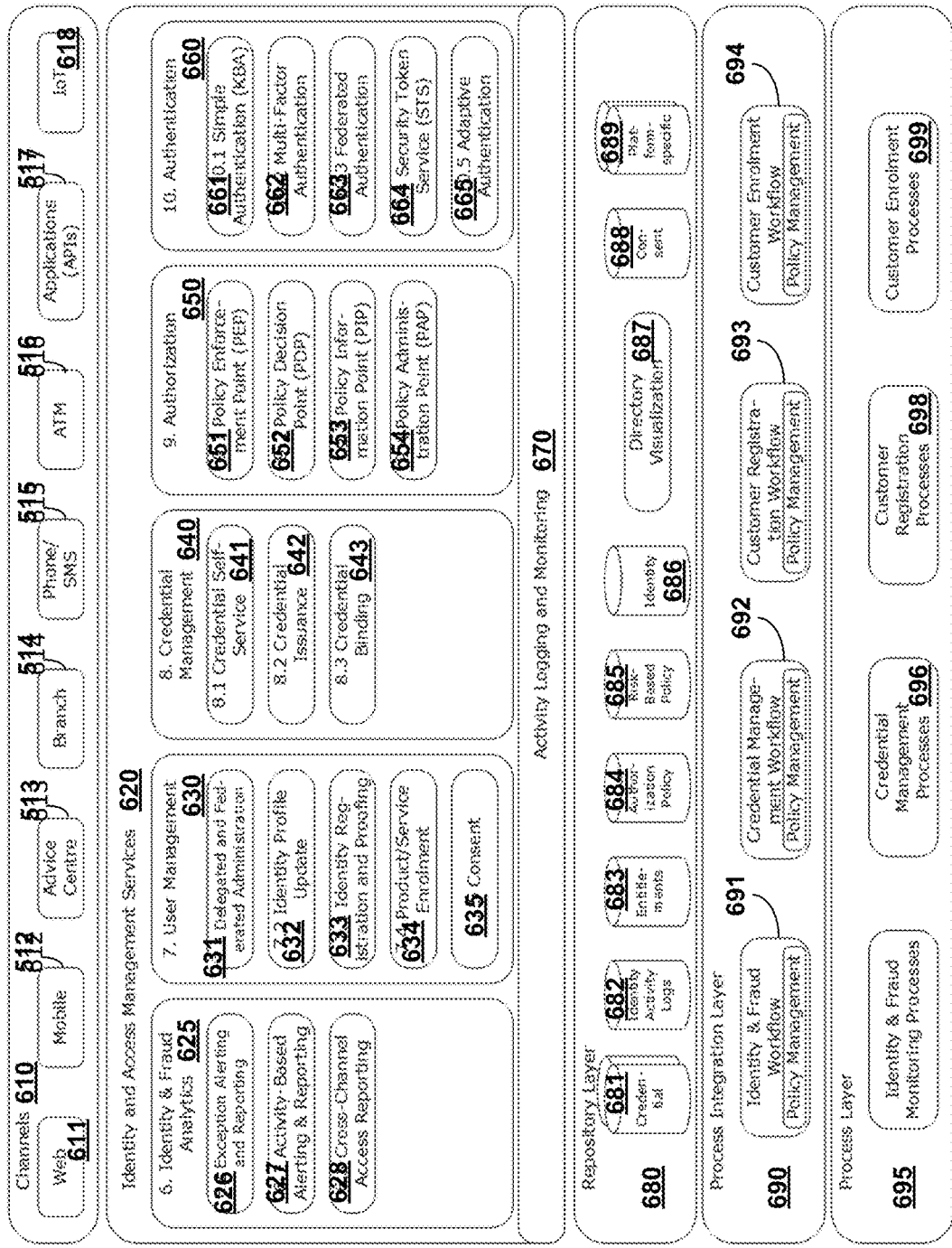
FIG. 6 illustrates, in a component diagram, an example of a RIAM business context system, in accordance with some embodiments.

FIG. 6 illustrates, in a component diagram, an example of a RIAM business context system 600, in accordance with some embodiments. The system 600 comprises channels 610, an identity and access management services unit 620, a repository layer unit 680, a process integration layer unit 690, and a process layer unit 695. The business channels may include a web application 601, a mobile application 602, an advice centre 603, a branch 604, a phone/SMS service 605, an ATM 606, application APIs 607, and internet of things (IoT) 608. The access management services unit 620 includes an identity and fraud analytics unit 625, a user management unit 630, a credential management unit 640, an authorization unit 650, an authentication unit 660 and an activity logging and monitoring unit 670. The identity and fraud analytics unit 625 includes an exception alerting and reporting unit 626, an activity-based alerting and reporting unit 627, and a cross-channel access and reporting unit 628. The user management unit includes a delegated and federated administration unit 631, an identity profile update unit 632, an identity registration and proofing unit 633, a product/service enrolment unit 634, and a consent unit 635. The credential management unit 640 includes a credential self-service unit 641, a credential issuance unit 642, and a credential binding unit 643. The authorization unit 650 includes a policy enforcement point (PEP) unit 651, a policy decision point (PDP) unit 652, a policy information point unit (PIP) 653, and a policy administration point (PAP) unit 654. The authentication unit may include a simple authentication (KBA) unit 661, a multi-factor authenticator unit 662, a federated authentication unit 663, a security token service unit 664, and an adaptive authentication unit 665. The repository layer unit 680 includes a credential repository 681, an identity activity logs repository 682, an entitlements repository 683, an authorization repository 684, a risk-based policy repository 685, an identity repository 686, a directory visualization unit 687, a consent repository 688, and a platform-specific repository 689. The process integration layer unit 690 includes an identity and fraud workflow unit 691, a credential management workflow unit 692, a customer registration workflow unit 693, and a customer enrolment workflow 694. Each component in the process integration layer 690 includes a policy management unit. The process layer unit 695 includes an identity and fraud monitoring processes unit 696, a credential management process unit 697, a customer registration processes unit 698, and a customer enrolment processes unit 699. Other components may be added to the system 600.

In some embodiments, risk level estimation in a real-time context may be implemented in a manner that does not interfere with a fraud detection system. The risk level estimation is focused on authentication, and is done in real-time or near-real-time.

The risk scores and thresholds described above may be modelled using machine learning. Machine learning can be supervised, unsupervised, semi-supervised, or reinforced. Supervised learning is the process in which we use the inputs to predict the values of the outputs. For supervised learning, a full set of labeled data is used while training an algorithm. Labeled data means that each instance or vector of input attributes in the training dataset is tagged with the answer and the created algorithm should come up with the same answer. Supervised learning is especially useful for classification and regression problems, and the majority of ML's practical value today comes from supervised learning. Classification is about predicting a particular class or group—discrete value, and regression look at continuous data and predicts a quantity. A classic data mining technique is based on machine learning.

In unsupervised learning, the training data set is a collection of examples without a specific desired outcome or correct answer. The model then attempts to find structure in the data by extracting useful features and analyzing its content. Unsupervised learning model can organize the data by grouping instances together (clustering), looking at unusual patterns (anomaly detection), correlating a data sample with each other and predict other associated attributes.

Semi-supervised learning use both unlabeled and labeled data for training, typically uses a small amount of labeled data. The idea is based on the observation that that unlabeled data, when used with a small amount of labeled data, can produce considerable improvement in learning accuracy. Reinforcement machine learning attempts to find-out the optimal way to accomplish a particular goal, or improve performance on a specific task. As the agent takes action that contributes to the goal, it receives a reward. The overall aim is to predict the best next step to take to earn the biggest last reward.

Digital identity is a set of attributes related to digital entity which may be a person, organization, application, or device. For example, person digital identity is a combination of traditional ID attributes such as name, address, birthday and data associated to that person such as email address, username, password, mouse speed, typing speed, search habits, purchasing behaviour.

RADE

In some embodiments, a Risk Authentication Decision Engine (RADE) is provided. RADE is a customized ML that evaluates digital identity. The inputs are digital identity attributes, and the output is risk score or digital identity risk class. A supervised machine learning (ML) classifier may be used to estimate risk level. In the following example, the implementation of risk level estimation after the gateway is provided. It should be understood that the implementations of risk estimation before and at the gateway may also be based on ML.

Input Data

Attributes collected for risk-based authentication (RBA) are IP, User Agent, Language, Display Resolution, Time Stamps, and Mouse and Keyboard Dynamics.

Internet Protocol (IP) Address

IP address is a numerical label assigned to each device connected to a network. Geolocation software can determine country, region, city and often ZIP code from user's IP. An external API may be used to acquire geographic location data from an IP address.

User Agent (UA)

User agent may identify the browser (Browser ID) according to specifications. UA includes information about the user computer operating System, its current Version, its Internet browser and the language.

It is a string that contains information about the application type, operating system, software vendor or software version of the requesting software user agent.

UA is compatible with desktop browsers, as well as with mobile application browsers. It may be millions of UAs combinations given that it changes with the software and hardware.

Language

Browser's language preference is part of users' identity. However, a user can be familiar with multiple languages, so this attribute has a low risk impact.

Display Resolution

Hardware parameter, that does not uniquely identify the user, but if this attribute is not as expected additional verification may be required.

Time Stamps

Most of the customers perform their work during day or in the evening. For example, if the customer is trying to access resources between 2 A.M. and 3 A.M. we consider that to be more risky than if he tries to access it during regular business hours. Access time can be associated to risk level, and also time drift can be taken in the consideration, if the time zone associated to IP is different from time zone set in browser, that access may need additional verification.

Mouse and Keyboard Dynamics

Behavioural biometrics such as keystroke (mouse and keyboard) dynamics are less reliable than physiological biometrics. It has higher variations because it depends on a lot of other factors such as mood, influence of medications, ergonomics. This may increase false acceptances rate (FAR) and false rejection rate (FRR). We can classify keyboard dynamic factors based on pressing and releasing key into 11 factors, and mouse dynamics based on movement and clicks into 10 biometrics factors. For keyboard we need to record of at least 10 consecutive keystrokes, and the mouse features are usually extracted from batches of 30 consecutive mouse actions.

Canvas Fingerprinting

The fingerprint is primarily based on the browser, operating system, and installed graphics hardware. Although it does not uniquely identify it is commonly used for tracking users.

Risk Evaluation Module

Two request types, registration and log-in are recognized. The attributes collected during registration are stored into a database and used as main reference.

TABLE 1

| | Distinguishing Information | | | | |
|---|---|---|---|---|---|
| Attribute | IP | User Agent | Language | Resolution | Login time |
| Statistical significance | High | Low | Low | Low | Medium |

User's data acquired during registration process are considered as reference data, that belongs to class 0. Training model is created based on registration user data and statistical data related to risk level. Surjective function translates ip into the class that represents the deviation form registered ip.

$$ip \twoheadrightarrow \{0,1,2,3\}$$

In a similar way another function translates time into day, evening, and night.

$$Time \twoheadrightarrow \{day, evening, night\}$$

User agent (UA), language (L), and resolution (R) are translated to true if provided string is the same as the original, or false if it is different.

$$U_{A,L,R} \twoheadrightarrow \{T,F\}$$

Mouse and Keyboard Dynamics and Canvas Fingerprinting attributes are used in creation of separate models. Risk scores from those models are combined with the risk score from our basic model that use five attributes shown in Table 1.

Types of Statistical Data

Three common data types used in ML are categorical, numerical, and ordinal. Categorical data can be used to represent hometown. Numerical data is either discrete such as 0, 1, 2, 3, or continuous like 2.32324. Ordinal data mixes numerical and categorical data—the data fall into categories, but the numbers placed on the categories have meaning. An example of ordinal data is a time interval where number 0 represent time between 6 A.M. and 6 P.M., number 1 time between 6 P.M. and 12 A.M., and number 2 time between 12 A.M. and 6 A.M.

Implementation

In some embodiments, a supervised machine learning classification model may be implemented using Java ML libraries. The process comprises two principal parts. The initial tread is pre-processing or data conversion in such a manner to be useful for supervised model creation, and the second step is the classification. All input data are ordinal type. Customer's non-personal information may be combined with login-time parameters. Even the simplest implementation of a decision model by conditional statements would significantly increase the complexity of the program, because of high cyclomatic complexity. That would directly affect maintainability and scalability of the program, as well as to some extent program reusability. By using the machine learning approach, this problem is overcome. The training set does not need to specify the output for any possible combinations on inputs, the algorithm itself estimates most likely outputs for those inputs that are not in the training set.

Figure 7:
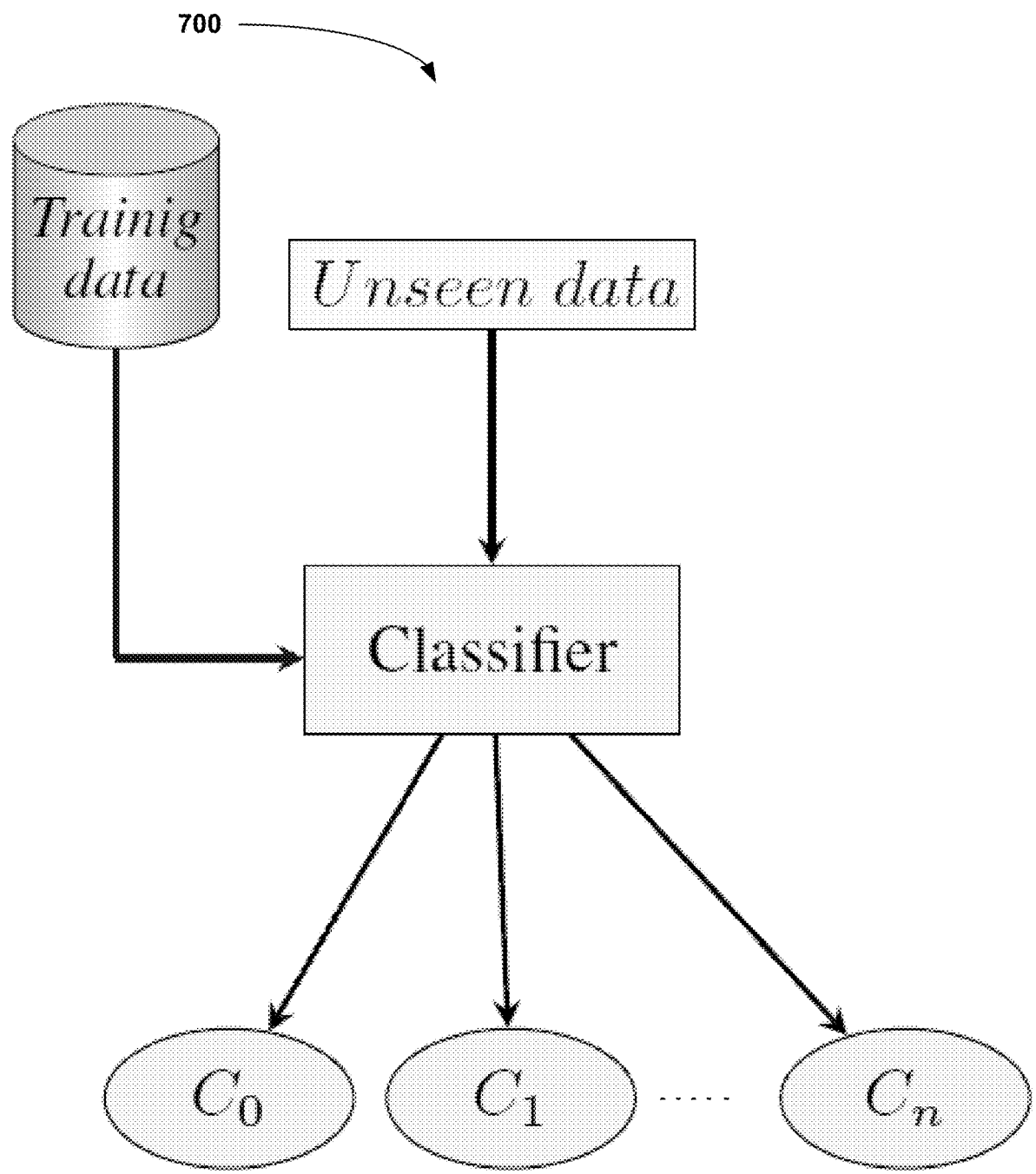
FIG. 7 illustrates an example of a classifier architecture, in accordance with some embodiments.

FIG. 7 illustrates an example of a classifier architecture 700, in accordance with some embodiments. The model may be created based on one or more of the following classification algorithms (1) J48, (2) PART, (3) Decision Table, and (4) Naive Bayes. J48 is Weka implementation of C4.5 algorithm that generates a decision tree using the concept of information entropy. It is probably the most popular classification algorithm. PART is similar to J48, but instead of full tree, it can build just a partial tree. This is done by getting rid of the rule for the largest leaf. The Decision Table algorithm implementation is based IDTM an Induction algorithm for the representation called DTM (Decision Table Majority). Naive Bayes classifier is a numeric estimator, the values are chosen based on analysis of the training data. In some embodiments, all four algorithms may be trained on the training set of 96 instances. The performance may be verified on the test set of 21 instances and the result is shown in the Table 2. The algorithms J48 and PART perform the same on our small dataset, so in this case there is no longest leaf that would be cut by PART algorithm.

TABLE 2

Cross-validation Results

|  | J48 | PART | D. Table | N. Bayes |
|---|---|---|---|---|
| Correct | 90.48% | 90.48% | 47.62% | 71.42% |
| Incorr.($\delta$ = 1) | 9.52% | 9.52% | 51.91% | 28.57% |
| Incorr.($\delta$ = 2) | 0 | 0 | 0.47% | 0% |
| TP Rate[1] | 0.905 | 0.905 | 0.476 | 0.714 |
| FP Rate | 0.030 | 0.030 | 0.169 | 0.106 |
| ROC Area | 0.987 | 0.987 | 0.717 | 0.888 |
| PRC Area | 0.956 | 0.956 | 0.399 | 0.763 |

In a real-time process, it is important to not only be correct but also to meet the deadline. If the correct result comes too late, it is not useful. DE classifier is a soft real-time system, meaning that delay may create some user's inconvenience if user needs to wait a bit longer to be authenticated.

Figure 8:
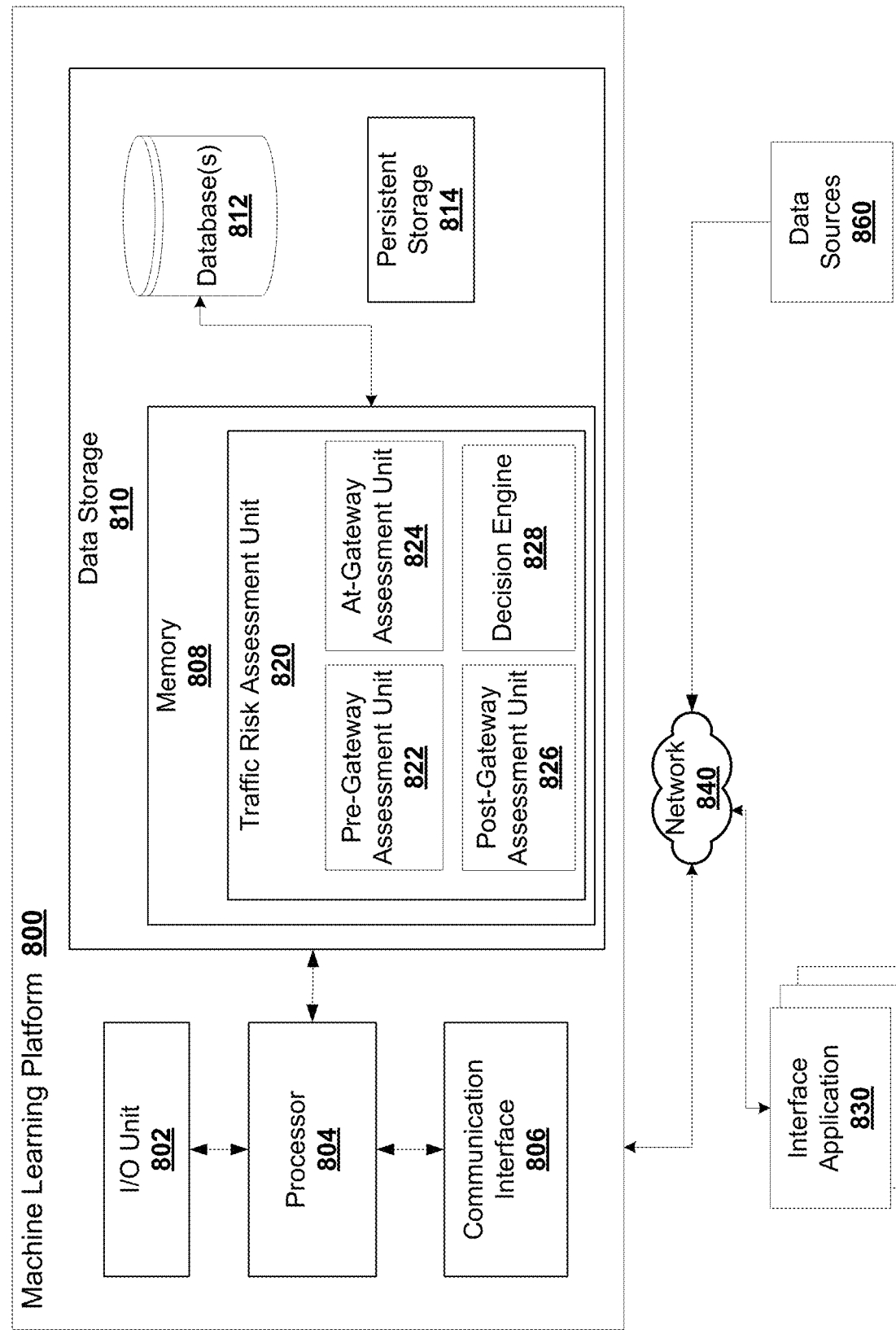
FIG. 8 illustrates, in a schematic diagram, an example of a physical environment for a machine learning platform, in accordance with some embodiments.

FIG. 8 illustrates, in a schematic diagram, an example of a physical environment for a machine learning platform 800, in accordance with some embodiments. The platform 800 may be an electronic device connected to interface application 830 and data sources 860 via network 840. The platform 800 can implement aspects of the processes described herein for link improvement prediction.

The platform 800 may include at least one processor 804 (herein referred to as "the processor 804") and a memory 808 storing machine executable instructions to configure the processor 804 to receive a machine learning model (from e.g., data sources 860). The processor 804 can receive a trained machine learning model and/or can train a machine learning model using a training engine. The platform 800 can include an I/O Unit 802, communication interface 806, and data storage 810. The processor 804 can execute instructions in memory 808 to implement aspects of processes described herein.

The platform 800 may be implemented on an electronic device and can include an I/O unit 802, a processor 804, a communication interface 806, and a data storage 810. The platform 800 can connect with one or more interface devices 830 or data sources 860. This connection may be over a network 840 (or multiple networks). The platform 800 may receive and transmit data from one or more of these via I/O unit 802. When data is received, I/O unit 802 transmits the data to processor 804.

The I/O unit 802 can enable the platform 800 to interconnect with one or more input devices, such as a keyboard, mouse, camera, touch screen and a microphone, and/or with one or more output devices such as a display screen and a speaker.

The processor 804 can be, for example, any type of general-purpose microprocessor or microcontroller, a digital signal processing (DSP) processor, an integrated circuit, a field programmable gate array (FPGA), a reconfigurable processor, or any combination thereof.

The data storage 810 can include memory 808, database(s) 812 and persistent storage 814. Memory 808 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Data storage devices 810 can include memory 808, databases 812 (e.g., graph database), and persistent storage 814.

The communication interface 806 can enable the platform 800 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others, including any combination of these.

The platform 800 can be operable to register and authenticate users (using a login, unique identifier, and password for example) prior to providing access to applications, a local network, network resources, other networks and network security devices. The platform 900 can connect to different machines or entities.

The data storage 810 may be configured to store information associated with or created by the platform 800. Storage 810 and/or persistent storage 814 may be provided using various types of storage technologies, such as solid state drives, hard disk drives, flash memory, and may be stored in various formats, such as relational databases, non-relational databases, flat files, spreadsheets, extended markup files, etc.

The memory 808 may include a traffic risk assessment module 820 (or other system for controlling and/or authorizing access to an API back end service). The traffic risk assessment module 820 may perform the method of preventing a malicious or unauthorized access to a back end services as described above. The traffic assessment module 820 may include a pre-gateway assessment unit 822 for determining a first risk score for API traffic before it reaches the API gateway, an at-gateway assessment unit 824 for determining a second risk score for API traffic at the API gateway, a post-gateway assessment unit 826 for determining a third risk score for API traffic at a back end service, and a decision engine 828 for determining an authentication action to take in response to the first, second and/or third risk scores.

Figure 9:
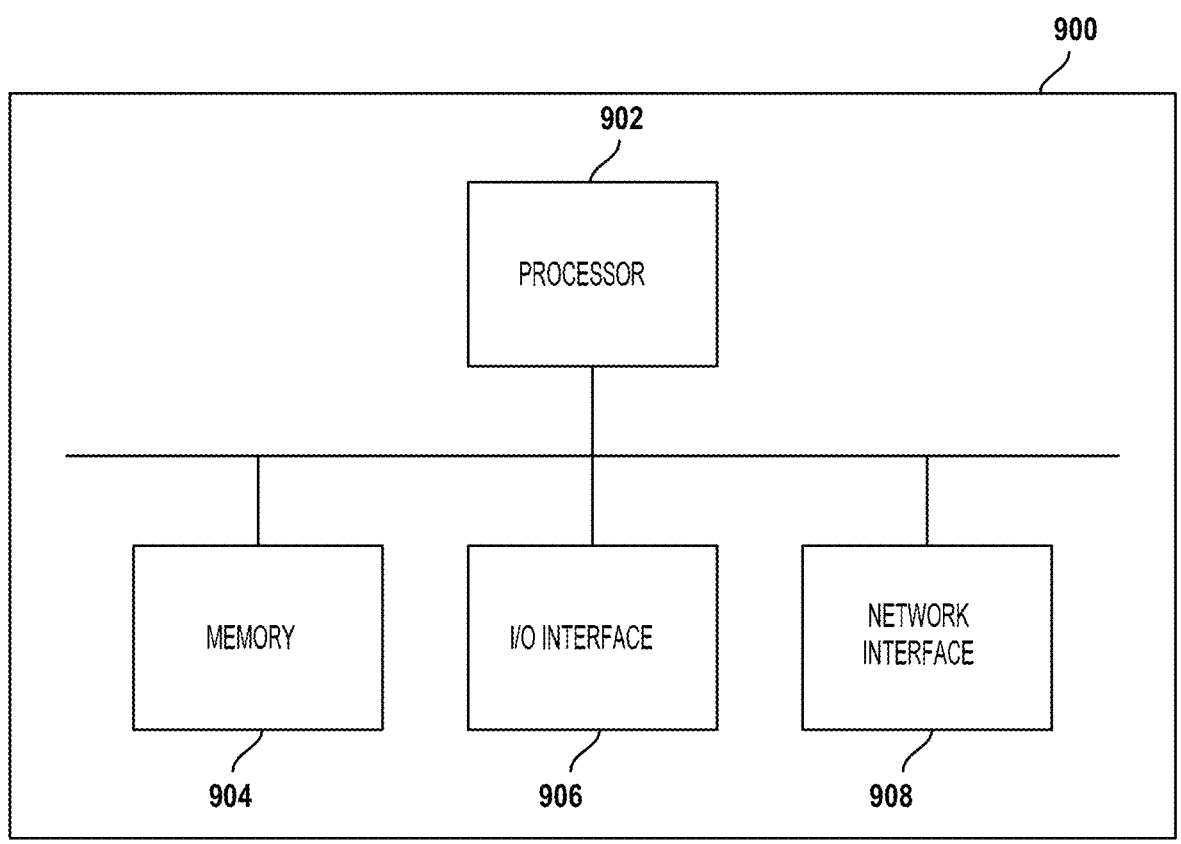
FIG. 9 is a schematic diagram of a computing device such as a server.

FIG. 9 is a schematic diagram of a computing device 900 such as a server. As depicted, the computing device includes at least one processor 902, memory 904, at least one I/O interface 906, and at least one network interface 908.

Processor 902 may be an Intel or AMD x86 or x64, PowerPC, ARM processor, or the like. Memory 904 may include a suitable combination of computer memory that is located either internally or externally such as, for example, random-access memory (RAM), read-only memory (ROM), compact disc read-only memory (CDROM).

Each I/O interface 906 enables computing device 900 to interconnect with one or more input devices, such as a keyboard, mouse, camera, touch screen and a microphone, or with one or more output devices such as a display screen and a speaker.

Each network interface 908 enables computing device 900 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others.

The foregoing discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. An authorization access system comprising:
   at least one processor; and
   a memory storing instructions which when executed by the at least one processor configure the at least one processor to:
   retrieve data portions associated with application programming interface (API) traffic for transmission between a user device and a destination device;
   observe behavior of the API traffic, the API traffic behavior comprising at least one of:
   an interface interactive pattern comprising at least one of:
   a movement pattern of a mouse; or
   a keyboard strokes pattern; or
   an end user access pattern comprising at least one of:
   a time pattern; or
   a behavior pattern;
   generate, prior to operations at an API gateway and using a first machine learning model, a first risk score representing an assessment associated with the API traffic;
   generate, at the API gateway and using a second machine learning model, a second risk score based on an assessment associated with the API traffic observed at the API gateway, the second risk score being a function of said first risk score and said assessment associated with the API traffic observed at the API gateway, said second risk score being greater than said first risk score;
   prior to continued transmission of the API traffic to the destination device, generate, by a third machine learning model, a third risk score representing an assessment of the API traffic at the destination device positioned subsequent to the API gateway, the third risk score being a function of said second risk score and said assessment of said API traffic at said destination device positioned subsequent to said API gateway, said third risk score being greater than said second risk score and said first risk score; and
   perform an authorization action enabling transmission of the API traffic between the user device and the destination device based on any of the first, second or third risk scores, wherein to perform the authorization action the at least one processor is configured to one of:
   allow the API traffic;
   block the API traffic;
   send a security alert; or
   require an authorization credentials check from a user device associated with the API traffic.

2. The system as claimed in claim 1, wherein the second risk score is determined based on information from the first risk score, and wherein the third risk score is determined based on information from the first risk score or from the second risk score.

3. The system as claimed in claim 1, wherein the at least one processor is configured to:
   observe the API traffic prior to the API traffic arriving at the API gateway;
   determine the first risk score;
   observe the API traffic at the API gateway;
   determine the second risk score;
   observe the API traffic at a back end service after the API gateway; and
   determine the third risk score.

4. The system as claimed in claim 1, wherein the at least one processor is configured to identify device information of the user device associated with the API traffic, the device information comprising at least one of:
   an internet protocol (IP) address associated with the user device of the API traffic;
   hardware information associated with the user device, the hardware information comprising at least one of:
   an application version attribute;
   a geographic position; or
   a hardware concurrency attribute; or
   software information associated with the user device, the software information comprising at least one of:
   a user agent attribute; or
   a browser language selection.

5. The system as claimed in claim 1, wherein the at least one processor is configured to:
   observe the API traffic at a different point in the API architecture;
   determine another risk score; and
   assign another risk score to API traffic observed at the different point in the API architecture.

6. The system as claimed in claim 1, wherein the at least one processor is configured to:
   observe subsequent API traffic associated with the user device prior to the API gateway;
   update the first risk score based on the subsequent API traffic prior to the API gateway;
   observe subsequent API traffic associated with the user device at the API gateway;
   update the second risk score based on the subsequent API traffic at the API gateway;
   observe subsequent API traffic associated with the user device after the API gateway; and
   update the third risk score based on the subsequent API traffic after the API gateway.

7. The system as claimed in claim 1, wherein generating, at the API gateway, the second risk score based on the assessment associated with the API traffic observed at the API gateway is in response to determining that the first risk score meets a condition.

8. A method of minimizing unauthorized access to a network, the method comprising:
   retrieving data portions associated with application programming interface (API) traffic for transmission between a user device and a destination device;
   observing behavior of the API traffic, the API traffic behavior comprising at least one of:
   an interface interactive pattern comprising at least one of:
   a movement pattern of a mouse; or
   a keyboard strokes pattern; or
   an end user access pattern comprising at least one of:
   a time pattern; or
   a behavior pattern;
   generating, prior to operations at an API gateway and using a first machine learning model, a first risk score representing an assessment associated with the API traffic;
   generating, at the API gateway and using a second machine learning model, a second risk score based on an assessment associated with the API traffic observed at the API gateway, said second risk score being a function of said first risk score and said assessment associated with said API traffic observed at said API gateway, said second risk score being greater than said first risk score;

prior to continued transmission of the API traffic to the destination device, generating, by a third machine learning model, a third risk score representing an assessment of the API traffic at the destination device positioned subsequent to the API gateway, said third risk score being a function of said second risk score and said assessment of said API traffic at said destination device positioned subsequent to said API gateway, said third risk score being greater than or equal to said second risk score and said first risk score; and performing an authorization action to enable transmission of the API traffic between the user device and the destination device based on any of the first, second or third risk scores, wherein the authorization action comprises one of:

allowing the API traffic;

blocking the API traffic;

sending a security alert; or requiring an authorization credentials check from a user device associated with the API traffic.

9. The method as claimed in claim 8, wherein the second risk score is determined based on information from the first risk score, and wherein the third risk score is determined based on information from the first risk score or from the second risk score.

10. The method as claimed in claim 8, comprising:

observing, by the at least one processor, the API traffic prior to the API traffic arriving at the API gateway;

determining, by at least one processor, the first risk score;

observing, by at least one processor, the API traffic at the API gateway;

determining, by at least one processor, the second risk score;

observing, by at least one processor, the API traffic at a back end service after the API gateway; and determining, by at least one processor, the third risk score.

11. The method as claimed in claim 8, comprising identifying device information of the user device associated with the API traffic, the device information comprising at least one of:

an internet protocol (IP) address associated with the user device of the API traffic;

hardware information associated with the user device, the hardware information comprising at least one of:

an application version attribute;

a geographic position; or a hardware concurrency attribute; or software information associated with the user device, the software information comprising at least one of:

a user agent attribute; or a browser language selection.

12. The method as claimed in claim 8, comprising:

observing, by at least one processor, the API traffic at a different point in the API architecture;

determining, by at least one processor, another risk score; and assigning, by at least one processor, another risk score to API traffic observed at the different point in the API architecture.

13. The method as claimed in claim 8, comprising:

observing, by at least one processor, subsequent API traffic associated with the user device prior to the API gateway;

updating, by at least one processor, the first risk score based on the subsequent API traffic prior to the API gateway;

observing, by at least one processor, subsequent API traffic associated with the user device at the API gateway;

updating, by at least one processor, the second risk score based on the subsequent API traffic at the API gateway;

observing, by at least one processor, subsequent API traffic associated with the user device after the API gateway; and updating, by at least one processor, the third risk score based on the subsequent API traffic after the API gateway.

14. The method as claimed in claim 8, wherein generating, at the API gateway, the second risk score based on the assessment associated with the API traffic observed at the API gateway is in response to determining that the first risk score meets a condition.

* * * * *